(12) United States Patent
Yoshii et al.

(10) Patent No.: US 8,291,281 B2
(45) Date of Patent: Oct. 16, 2012

(54) OPTICAL TRANSMITTER AND RECEIVER AND OPTICAL TRANSMISSION AND RECEPTION SYSTEM

(75) Inventors: Hiromu Yoshii, Fukuoka (JP); Akira Yamamoto, Fukuoka (JP); Yuichiro Sakane, Fukuoka (JP); Masahiro Oohashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 12/379,602

(22) Filed: Feb. 25, 2009

(65) Prior Publication Data

US 2009/0300460 A1    Dec. 3, 2009

(30) Foreign Application Priority Data

Jun. 3, 2008    (JP) .................................. 2008-146229

(51) Int. Cl.
H03M 13/00    (2006.01)
(52) U.S. Cl. ........................................ 714/752
(58) Field of Classification Search .................. 714/752, 714/786
See application file for complete search history.

(56) References Cited

U.S. PATENT DOCUMENTS

| 6,735,725 | B1 * | 5/2004 | Wu et al. | 714/704 |
| 6,851,086 | B2 * | 2/2005 | Szymanski | 714/781 |
| 7,035,552 | B2 * | 4/2006 | Hayashi et al. | 398/192 |
| 7,489,621 | B2 * | 2/2009 | Maltsev et al. | 370/205 |
| 7,823,041 | B2 * | 10/2010 | Mezer et al. | 714/752 |
| 7,917,828 | B2 * | 3/2011 | Tate et al. | 714/752 |
| 2002/0091982 | A1 * | 7/2002 | Ohira et al. | 714/752 |
| 2002/0178417 | A1 * | 11/2002 | Jacob et al. | 714/752 |
| 2003/0005385 | A1 * | 1/2003 | Stieger | 714/758 |
| 2003/0115529 | A1 * | 6/2003 | Ohira et al. | 714/752 |
| 2007/0250760 | A1 * | 10/2007 | Li | 714/786 |
| 2008/0155383 | A1 * | 6/2008 | Haustein et al. | 714/786 |
| 2009/0013233 | A1 * | 1/2009 | Radke | 714/752 |
| 2011/0167314 | A1 * | 7/2011 | Gerstel et al. | 714/752 |

FOREIGN PATENT DOCUMENTS

| EP | 1271809 A2 | 1/2003 |
| EP | 1271809 A3 | 12/2004 |
| JP | 4-115737 | 4/1992 |
| JP | 11-7736 | 1/1999 |
| JP | 2003-18096 | 1/2003 |
| JP | 2005-20063 | 1/2005 |
| JP | 2006-332920 | 12/2006 |
| JP | 2007-36607 | 2/2007 |
| JP | 2007-104571 | 4/2007 |
| JP | 2008-54244 | 3/2008 |

OTHER PUBLICATIONS

Japanese Office Action issued Apr. 26, 2010 in corresponding Japanese Patent Application 2008-146229.

* cited by examiner

*Primary Examiner* — Yolanda L Wilson
(74) *Attorney, Agent, or Firm* — Staas & Halsey LLP

(57) ABSTRACT

An optical transmitter and receiver has stored in advance therein FEC techniques and applicable conditions for applying the FEC techniques to a counterpart optical transmitter and receiver. The optical transmitter and receiver measures a state of receiving data transmitted from the counterpart optical transmitter and receiver, determines an applicable condition satisfying the measured data reception state from among the stored applicable conditions, and selects a FEC technique stored in association with the applicable condition determined as satisfying. The optical transmitter and receiver then notifies the counterpart optical transmitter and receiver of the selected FEC technique.

6 Claims, 15 Drawing Sheets

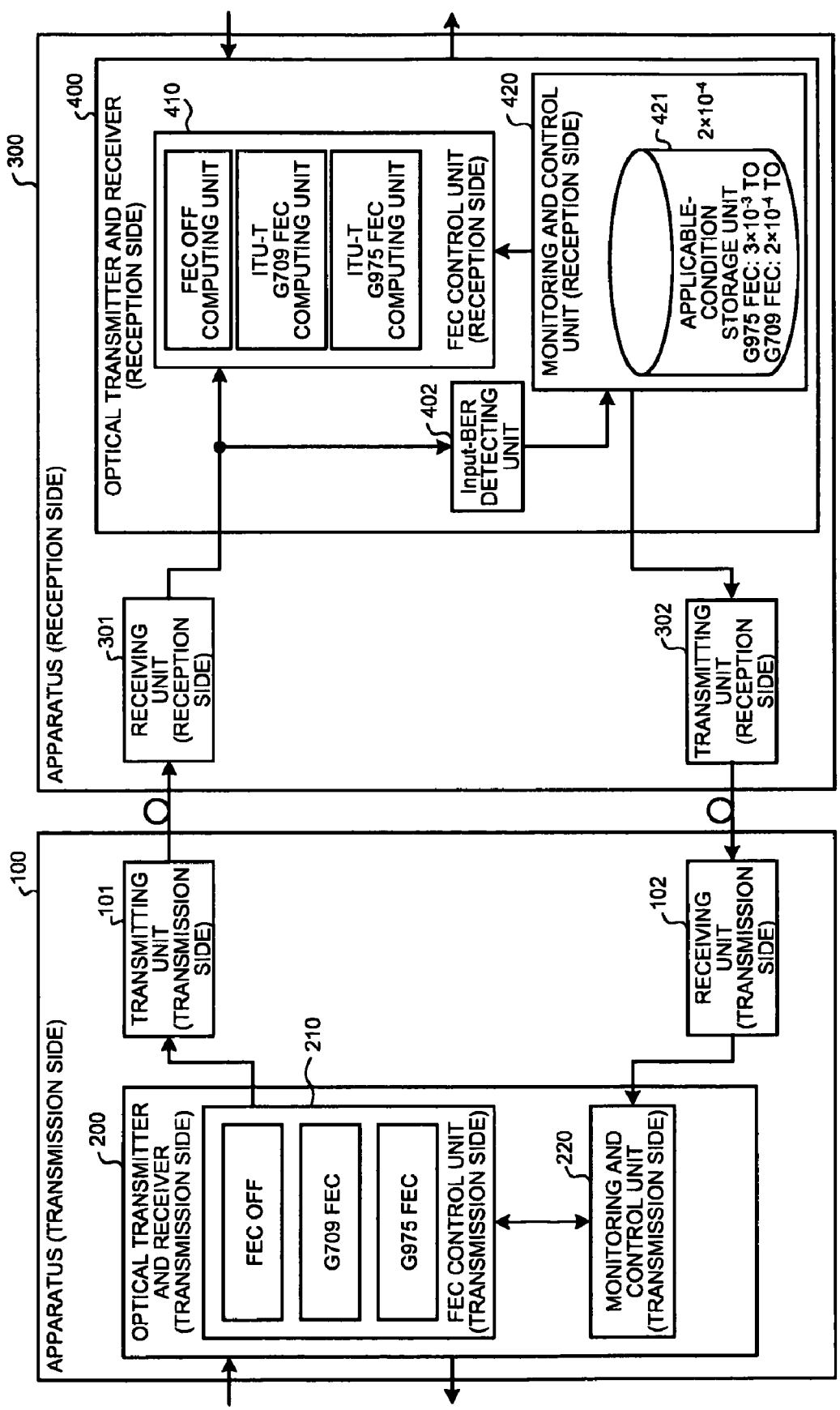

| FEC TECHNIQUE | APPLICABLE CONDITION |
|---|---|
| FEC OFF | TO $1\times10^{-12}$ |
| ITU-T G709 FEC | $1\times10^{-12}$ TO $2\times10^{-4}$ |
| ITU-T G975 FEC | $2\times10^{-4}$ TO $3\times10^{-3}$ |
| FEC OFF | $3\times10^{-3}$ TO |

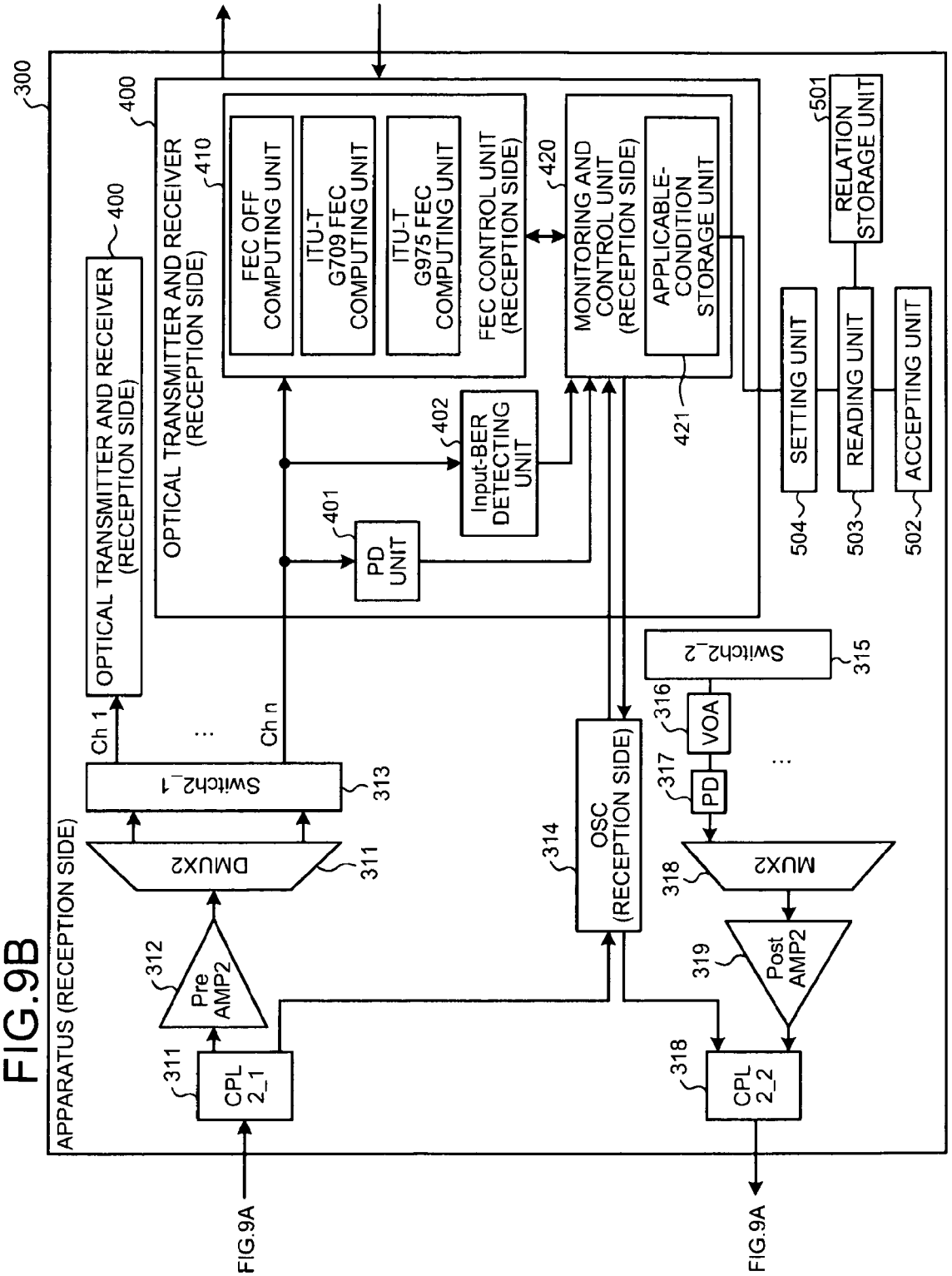

OPTICAL TRANSMITTER AND RECEIVER AND OPTICAL TRANSMISSION AND RECEPTION SYSTEM

CROSS-REFERENCE TO RELATED APPLICATION(S)

This application is based upon and claims the benefit of priority of the prior Japanese Patent Application No. 2008-146229, filed on Jun. 3, 2008, the entire contents of which are incorporated herein by reference.

FIELD

The embodiments discussed herein are directed to an optical transmitter and receiver and optical transmission and reception system.

BACKGROUND

Conventionally, various studies have been conducted on techniques using Forward Error Correction (FEC) in an optical communication network. FEC is a technique for an optical transmitter and receiver on a reception side to recover from an error occurring in the course of data transfer.

Here, the optical transmitter and receiver consumes power when using FEC. Also, there are a plurality of FEC techniques. For example, the optical transmitter and receiver consumes more power when using a FEC technique with a high error-recovery performance than that when using a FEC technique with a low error-recovery performance.

Furthermore, in a conventional optical transmitter and receiver, a technique is used in which settings for FEC (FEC technique) are input by maintenance staff at the time of the initial start of the optical transmitter and receiver. Still further, for example, in a conventional optical transmitter and receiver, a technique is used in which maintenance staff manually switches the FEC technique. Still further, for example, a technique is used in which a transmission path for use in transmitting data is switched by an optical transmitter and receiver when the transmission quality is poor (for example, refer to Japanese Laid-open Patent Publication No. 2003-18096, pp. 5-7, FIG. 1).

Meanwhile, in the conventional technology, there is a problem of being incapable of reducing power consumption.

For example, in the conventional techniques, once the FEC technique is set by maintenance staff, the optical transmitter and receiver often operates with the FEC technique being unchanged thereafter. Therefore, in the conventional techniques, since the optical transmitter and receiver continues to use an FEC technique that may be inappropriate in view of power consumption, and thus cannot reduce power consumption.

Specifically, for example, in the conventional optical transmitter and receiver, depending on the setting by the customer, FEC always operates even when the use of FEC is not required. For example, FEC operates when an optical input to the receiving device breaks, when an error rate incapable of error correction is input to the receiving device, or when the transmission quality is good enough to dispense with error correction. With this, the conventional optical transmitter and receiver always wastes power by consuming power for operating FEC, for example. Note that the technique of switching the transmission path is not in consideration of reducing power consumption.

SUMMARY

According to an aspect of the invention, an optical transmitter and receiver includes an applicable-condition storage unit that has stored in advance therein FEC techniques and applicable conditions in association with each other. The FEC techniques are applicable to a counterpart optical transmitter and receiver of the optical transmitter and receiver, and the applicable conditions are indicated by data reception states as applicable conditions for applying the FEC techniques to the counterpart transmitter and receiver. The optical transmitter and receiver also includes a measuring unit that measures a data reception state of receiving data transmitted from the counterpart optical transmitter and receiver; a technique selecting unit that determines an applicable condition satisfying the data reception state measured by the measuring unit from among the applicable conditions stored in the applicable-condition storage unit and selects a technique stored in the applicable-condition storage unit in association with the applicable condition; and a notifying unit that notifies the counterpart optical transmitter and receiver of the technique selected by the technique selecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWING(S)

FIG. 1 is a drawing for depicting a general outline of an optical transmission and reception system according to a first embodiment;

DESCRIPTION OF EMBODIMENT(S)

Figure 2A:
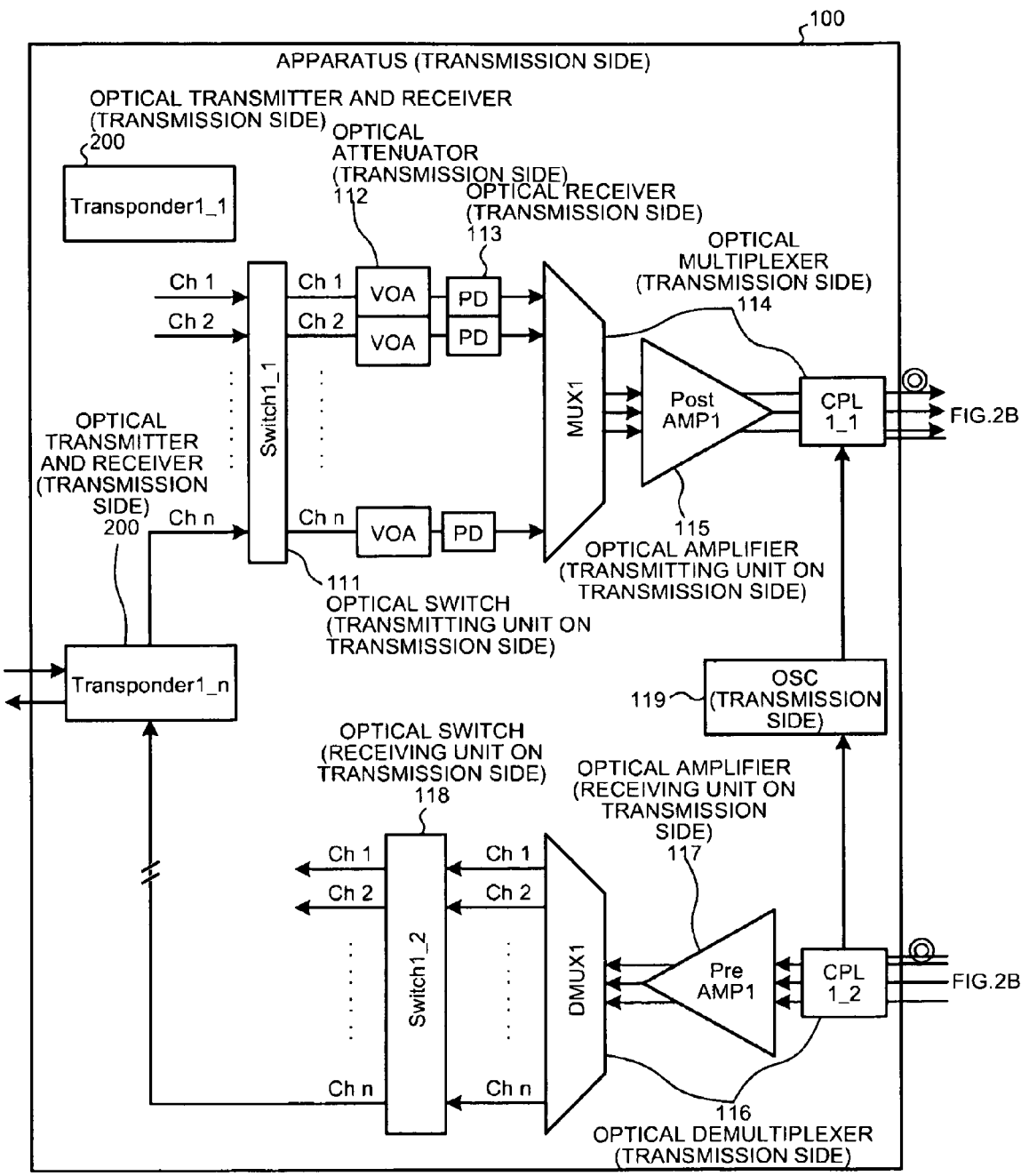
FIG. 2 is a block diagram for explaining an example of an entire configuration of the optical transmission and reception system in the first embodiment.

Preferred embodiments of the present invention will be explained with reference to accompanying drawings. In the following, main terms for use in a first embodiment, a general outline of an optical transmission and reception system according to the first embodiment, configuration and flow of process of the optical transmission and reception system, and effects of the first embodiment are explained in sequence, and then other embodiments are explained.

[a] First Embodiment

[Explanation of Terms]

First, main terms for use in the first embodiment are explained. "Forward Error Correction (FEC) technology (hereinafter simply referred to as "FEC")" for use in the first embodiment is a technology of recovering from an error included in received data. Specifically, an optical transmitter and receiver serving as a transmission side transmits data with redundant error correction code, whilst an optical transmitter and receiver serving as a reception side recovers from an error occurring in the course of data transfer by using the error correction code.

Also, settings for FEC (FEC techniques) are those applicable to a counterpart optical transmitter and receiver (transmission side) of an optical transmitter and receiver (reception side), that is, settings indicating which one of a plurality of FEC technologies is used by the optical transmitter and receiver (transmission side) to transmit an optical signal (or by the optical transmitter and receiver (reception side) to cause the reception data to recover). Note that the FEC techniques include setting without using any of the plurality of FEC technologies.

Also, the optical transmitter and receiver (transmission side) and the optical transmitter and receiver (reception side) consumes power when using any FEC technology. Also, there are a plurality of techniques for the FEC technology. For example, when using a FEC technology with a high error recovery performance, the optical transmitter and receiver consumes more power than power consumed when using a FEC technology with a lower error recovery performance.

[General Outline of the Optical Transmission and Reception System]

Next, the general outline of the optical transmission and reception system according to the first embodiment is explained by using FIG. 1. FIG. 1 is a drawing for explaining the general outline of the optical transmission and reception system according to the first embodiment.

In the following, for convenience of explanation of the optical transmission and reception system according to the first embodiment, an optical transmission and reception system including two apparatus facing each other is used as an example.

As depicted in the drawing, the optical transmission and reception system according to the first embodiment includes an apparatus (transmission side) 100 including an optical transmitters and receivers (transmission side) 200 and an apparatus (reception side) 300 including optical transmitters and receivers (reception side) 400. Each optical transmitter and receiver converts an electrical signal to an optical signal, or receives an optical signal for conversion to an electrical signal.

That is, in the optical transmission and reception system according to the first embodiment, the apparatus (transmission side) 100 transmits an optical signal to any of the optical transmitters and receivers (reception side) 400.

Specifically, in the apparatus (transmission side) 100, each optical transmitter and receiver (transmission side) 200 includes a FEC control unit (transmission side) 210 using a FEC technique set by a monitoring and control unit (transmission side) 220 to encode an electrical signal. For example, the FEC control unit (transmission side) 210 performs encoding by using "G975 FEC" as a FEC technique set by the monitoring and control unit (transmission side) 220. The optical transmitter and receiver (transmission side) 200 then converts the encoded electrical signal to an optical signal. The apparatus (transmission side) 100 then transmits the optical signal obtained by converting the electrical signal to the apparatus (reception side) 300.

Also, in the optical transmission and reception system according to the first embodiment, the apparatus (reception side) 300 repairs data included in the received optical signal by using an FEC technique.

Specifically, a receiving unit (reception side) 301 receives the optical signal from the apparatus (transmission side) 100. Then, in the apparatus (reception side) 300, each optical transmitter and receiver (reception side) 400 converts the received optical signal to an electrical signal. In more detail, the optical transmitter and receiver (reception side) 400 recovers from an error included in the electrical signal by using an computation technique set by a monitoring and control unit (reception side) 420 (a computation method corresponding to an FEC technique used by the optical transmitter and receiver (transmission side) 200).

Here, the optical transmission and reception system according to the first embodiment can reduce consumption power as explained in the following.

That is, in the optical transmission and reception system according to the first embodiment, as depicted in FIG. 1, the optical transmitter and receiver (reception side) 400 includes an applicable-condition storage unit 421 that stores applicable condition. Specifically, in the optical transmission and reception system according to the first embodiment, the optical transmitter and receiver (reception side) 400 stores FEC techniques and applicable conditions in association with each other in the applicable-condition storage unit 421. Here, an applicable condition is a condition for selecting a FEC technique to be applied in the optical transmitter and receiver (transmission side) 200, the condition being defined by a data reception state.

For example, in the optical transmission and reception system according to the first embodiment, the optical transmitter and receiver (reception side) 400 stores a FEC technique "G975 FEC" and an applicable condition (a ratio of errors included in data (error rate)) "$2\times10^{-4}$ to $3\times10^{-3}$" in association with each other in the applicable-condition storage unit 421.

Then, in the optical transmission and reception system according to the first embodiment, the optical transmitter and receiver (reception side) 400 measures a state of receiving data transmitted from the optical transmitter and receiver (transmission side) 200. Specifically, for example, in the optical transmitter and receiver (reception side) 400, an Input bit-error-rate (BER) detecting unit 402 depicted in FIG. 1 measures the ratio of errors included in data transmitted from the optical transmitter and receiver (transmission side) 200 as, for example, "$1\times10^{-3}$".

Then, in the optical transmission and reception system according to the first embodiment, the optical transmitter and receiver (reception side) 400 determines one of the applicable conditions stored in the applicable-condition storage unit 421 that is satisfied by the measured data reception state. An exemplary case is now explained in which the optical transmitter and receiver (reception side) 400 measures the ratio of errors included in the reception data as "$1\times10^{-3}$". In this case, the optical transmitter and receiver (reception side) 400 determines that the applicable condition satisfied by the data reception state is "$2\times10^{-4}$ to $3\times10^{-3}$".

Then, in the optical transmission and reception system according to the first embodiment, the optical transmitter and receiver (reception side) 400 selects a technique stored in the applicable-condition storage unit 421 in association with the applicable condition. Specifically, for example, in the optical transmitter and receiver (reception side) 400, the monitoring and control unit (reception side) 420 selects "G975 FEC" associated with the applicable condition "$2\times10^{-4}$ to $3\times10^{-3}$".

Then, in the optical transmission and reception system according to the first embodiment, the optical transmitter and receiver (reception side) 400 notifies the optical transmitter and receiver (transmission side) 200 of the selected technique. Specifically, for example, in the optical transmitter and receiver (reception side) 400, the monitoring and control unit (reception side) 420 depicted in FIG. 1 notifies the optical transmitter and receiver (transmission side) 200 of "G975 FEC" via a transmitting unit (reception side) 302.

Then, in the optical transmission and reception system according to the first embodiment, after being notified, the optical transmitter and receiver (transmission side) 200 uses the notified FEC technique to transmit data to the optical transmitter and receiver (reception side) 400. An exemplary case is now explained in which the optical transmitter and receiver (transmission side) 200 is notified by the optical transmitter and receiver (reception side) 400 of "G975 FEC" as a FEC technique. Here, when transmitting data after being notified, the optical transmitter and receiver (transmission side) 200 uses the FEC technique "G975 FEC" to encode data (electrical signal), converts the encoded electrical signal to an optical signal, and then transmits the optical signal to the optical transmitter and receiver (reception side) 400.

In this manner, the optical transmission and reception system according to the first embodiment can reduce power consumption as explained above.

In the conventional technique, in an optical transmitter and receiver with a FEC (error correction) function, the setting for FEC is often unchanged for operation once after being set.

Therefore, for example, in the conventional technique, even when an optical input to the receiving device breaks, an error rate incapable of error correction is input to the receiving device, or the transmission quality is good enough to dispense with error correction, the FEC function always operates depending on the setting by the customer. With this, the optical transmitter and receiver in the conventional technique always wastes power by consuming power for operating FEC.

Moreover, for example, in the conventional technique, a FEC technique that is inappropriate in view of power consumption is often used without being replaced. With this, the optical transmitter and receiver in the conventional technique consumes more power than power that would be consumed if an appropriate FEC technique is used.

Compared with the conventional technique as explained above, the optical transmission and reception system disclosed herein can use an appropriate FEC technique according to the data reception state, thereby reducing power consumption. That is, the optical transmitter and receiver (reception side) 400 determines an appropriate FEC technique according to the error rate, and notifies the counterpart optical transmitter and receiver (transmission side) 200 to cause the FEC technique to be switched. With this, compared with the conventional technique in which the FEC technique cannot be switched even it is inappropriate in view of power consumption, the optical transmission and reception system disclosed herein can prevent waste of power consumption.

[Configuration of the Optical Transmitter and Receiver]

Next, an example of configuration of the optical transmission and reception system according to the first embodiment is explained. In the following, an example of configuration of the apparatus (transmission side) 100 including the optical transmitter and receiver (transmission side) 200 is first explained, and then an example of configuration of the apparatus (reception side) 300 including the optical transmitter and receiver (reception side) 400 is explained. Thereafter, an example of configuration of the optical transmitter and receiver (transmission side) 200 is explained, and then an example of configuration of the optical transmitter and receiver (reception side) 400 is explained.

In the following, unless otherwise specified, it is assumed for explanation that the apparatus (transmission side) 100 and the apparatus (reception side) 300 have similar function. Under this assumption, in the following, the case is explained in which the optical transmitter and receiver (reception side) 400 applies a FEC technique to data transmitted from the apparatus (transmission side) 100.

Also, it is assumed that the apparatus (transmission side) 100 in the first embodiment accepts an optical signal from a client (transmission side) connected to the apparatus (transmission side) 100, converts the accepted optical signal to an electrical signal, converts the electrical signal to an optical signal, and then transmits the optical signal to the apparatus (reception side) 300. Furthermore, it is assumed that the optical transmitter and receiver (reception side) 400 and the apparatus (reception side) 300 multiplexes wavelengths of "n" channels for transmission and reception.

Still further, it is assumed that the apparatus (transmission side) 100 in the first embodiment accepts an optical signal from the apparatus (reception side) 300, converts the accepted optical signal to an electrical signal, converts the electrical signal to an optical signal, and then sends the optical signal to the client (transmission side).

Still further, it is assumed that the apparatus (reception side) 300 in the first embodiment converts an optical signal accepted from the apparatus (transmission side) 100 to an electrical signal, converts the electrical signal to an optical signal, and then transmits the optical signal to a client (reception side) connected to the apparatus (reception side) 300.

Still further, it is assumed that the apparatus (reception side) 300 in the first embodiment accepts an optical signal from the client (reception side), converts the accepted optical signal to an electrical signal, converts the electrical signal to an optical signal, and then transmits the optical signal to the apparatus (transmission side) 100.

[Configuration of the Apparatus (Transmission Side)]

Figure 2B:
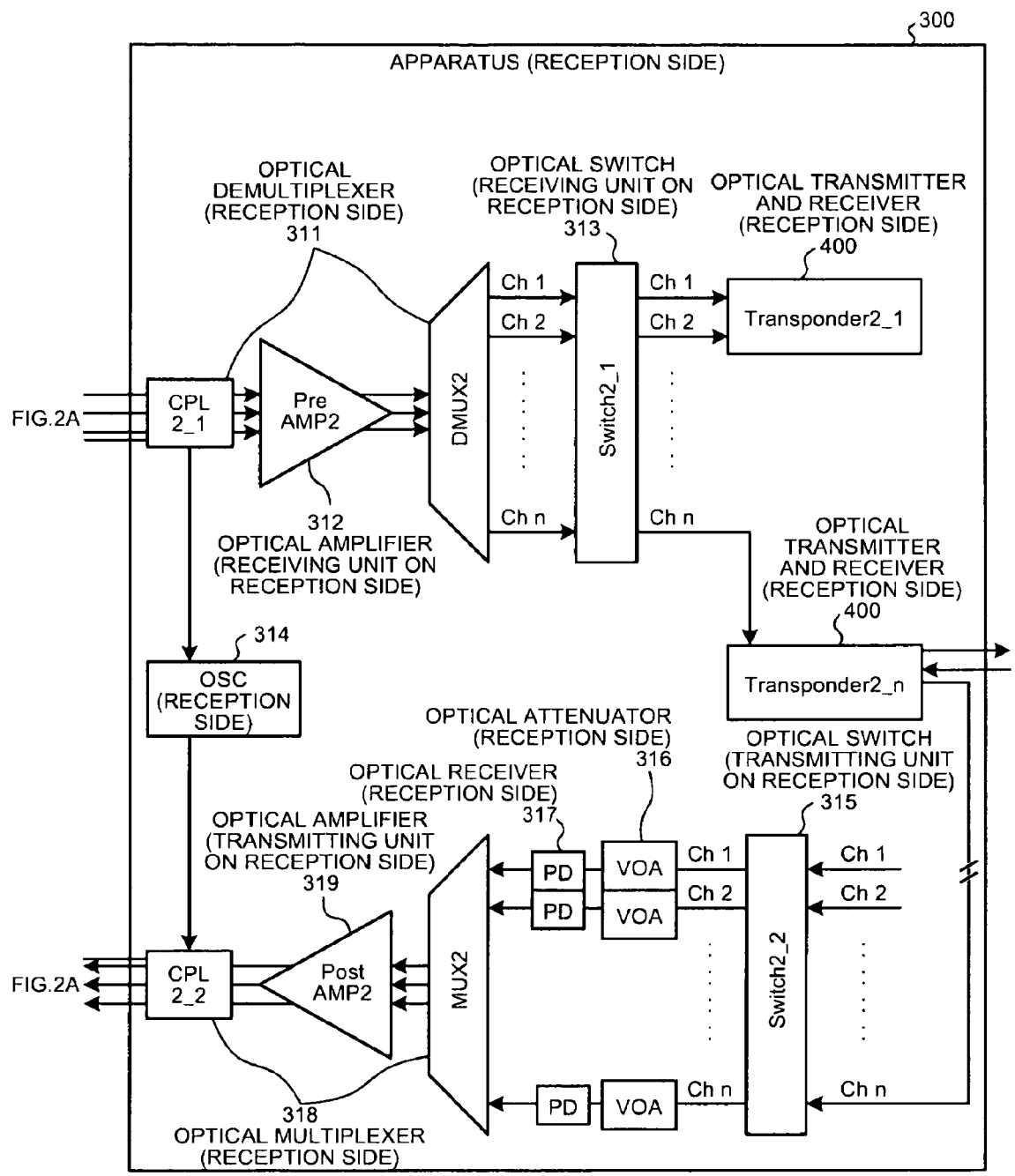

By using FIG. 2, an example of configuration of the apparatus (transmission side) 100 including the optical transmitter and receiver (transmission side) 200 is explained. FIG. 2 is a block diagram for explaining an example of an entire configuration of the optical transmission and reception system in the first embodiment.

As depicted in FIG. 2, the apparatus (transmission side) 100 particularly includes the optical transmitter and receiver (transmission side) 200. The apparatus (transmission side) 100 also includes an optical switch (transmitting unit, transmission side) 111, an optical attenuators (transmission side) 112, an optical receivers (transmission side) 113, an optical multiplexer (transmission side) 114, and an optical amplifier (transmitting unit, transmission side) 115. Furthermore, the apparatus (transmission side) 100 includes an optical demultiplexer (transmission side) 116, an optical amplifier (receiving unit, transmission side) 117, an optical switch (receiving unit, transmission side) 118, and an Optical Supervisory Channel (OSC) (transmission side) 119.

Here, for example, the optical switch (transmitting unit, transmission side) 111, the optical attenuators (transmission side) 112, the optical receivers (transmission side) 113, the optical multiplexer (transmission side) 114, the optical amplifier (transmitting unit, transmission side) 115, and the OSC (transmission side) 119 correspond to a transmitting unit (transmission side) 101 depicted in FIG. 1. Also, for example, the optical demultiplexer (transmission side) 116, the optical amplifier (receiving unit, transmission side) 117, the optical switch (receiving unit, transmission side) 118, and the OSC (transmission side) 119 correspond to a receiving unit (transmission side) 102 depicted in FIG. 1.

The optical transmitter and receiver (transmission side) 200 connects to the optical switch (transmitting unit, transmission side) 111 and the optical switch (receiving unit, transmission side) 118. Specifically, the number of optical transmitters and receivers (transmission side) 200 is equal to the number of channels, and each optical transmitter and receiver (transmission side) 200 connects to the optical switch (transmitting unit, transmission side) 111 and the optical switch (receiving unit, transmission side) 118. Also, the optical transmitter and receiver (transmission side) 200 connects to a client (transmission side).

Also, the optical transmitter and receiver (transmission side) 200 converts an optical signal to an electrical signal. Also, the optical transmitter and receiver (transmission side) 200 converts an electrical signal to an optical signal.

Specifically, the optical transmitters and receivers (transmission side) 200 as many as the number of channels each accept an optical signal of a wavelength of an assigned channel from the optical switch (receiving unit, transmission side) 118. Then, the optical transmitter and receiver (transmission side) 200 converts the accepted optical signal to an electrical signal. Then, the optical transmitter and receiver (transmission side) 200 converts the electrical signal to an optical signal of the wavelength of the assigned channel. Then, the optical transmitter and receiver (transmission side) 200 sends the optical signal to the client (transmission side).

Furthermore, the optical transmitter and receiver (transmission side) 200 accepts an optical signal of the wavelength of the assigned channel from the client (transmission side). Then, the optical transmitter and receiver (transmission side) 200 converts the accepted optical signal to an electrical signal. Then, the optical transmitter and receiver (transmission side) 200 converts the electrical signal to an optical signal of the wavelength of the assigned channel. The optical transmitter and receiver (transmission side) 200 then sends the optical signal to the optical switch (transmitting unit, transmission side) 111.

A process using a FEC technique by the optical transmitter and receiver (transmission side) 200 is explained further below, and therefore its explanation is omitted here.

The optical switch (transmitting unit, transmission side) 111 connects to each optical transmitter and receiver (transmission side) 200 and each optical attenuator (transmission side) 112. Also, the optical switch (transmitting unit, transmission side) 111 switches an optical path. Specifically, the optical switch (transmitting unit, transmission side) 111 accepts an optical signal from each optical transmitter and receiver (transmission side) 200. Then, the optical switch (transmitting unit, transmission side) 111 sends the accepted optical signal to the optical attenuator (transmission side) 112 corresponding to that optical signal.

The optical attenuators (transmission side) 112 connect to the optical switch (transmitting unit, transmission side) 111 and the optical receivers (transmission side) 113. Specifically, the number of optical attenuators (transmission side) 112 is equal to the number of channels, and the optical attenuators (transmission side) 112 each connect to the optical switch (transmitting unit, transmission side) 111 and the optical receivers (transmission side) 113.

Also, the optical attenuators (transmission side) 112 attenuate an optical level. Specifically, each of the optical attenuators (transmission side) 112 accepts an optical signal of an assigned wavelength from the optical switch (transmitting unit, transmission side) 111. Then, the optical attenuator (transmission side) 112 attenuates the optical level (intensity) of the accepted optical signal to a predetermined intensity. Then, the optical attenuator (transmission side) 112 sends the optical signal obtained by attenuating the optical level to the predetermined intensity to each of the optical receivers (transmission side) 113.

The reason for the optical attenuator (transmission side) 112 attenuating the optical level of the optical signal is to flatten the signal intensity of each wavelength of the signal transmitted from the apparatus (transmission side) 100 to make the signal quality constant.

The optical receivers (transmission side) 113 connects to the optical attenuators (transmission side) 112 and the optical multiplexer (transmission side) 114. Specifically, the number of optical receivers (transmission side) 113 is equal to the number of channels, and the optical receivers (transmission side) 113 each connect to the optical attenuators (transmission side) 112 and the optical multiplexer (transmission side) 114.

Also, the optical receivers (transmission side) 113 detects an optical signal. Specifically, the optical receivers (transmission side) 113 each detects that an optical signal of the assigned wavelength is sent from the optical attenuator (transmission side) 112 to the optical receiver (transmission side) 113, and then sends the optical signal to the optical multiplexer (transmission side) 114.

The optical multiplexer (transmission side) 114 connects to each of the optical receivers (transmission side) 113, the optical amplifier (transmitting unit, transmission side) 115, and the OSC (transmission side) 119. Also, the optical multiplexer (transmission side) 114 connects to the apparatus (reception side) 300 via an optical communication line.

Also, the optical multiplexer (transmission side) 114 multiplexes a plurality of optical signals of different wavelengths into a single output. Specifically, the optical multiplexer (transmission side) 114 accepts from the optical receivers (transmission side) 113 optical signals of wavelengths assigned to the respective optical receivers (transmission side) 113. Then, the optical multiplexer (transmission side) 114 multiplexes the accepted optical signals. Then, the optical multiplexer (transmission side) 114 sends the resultant optical signal obtained through multiplexing to the optical amplifier (transmitting unit, transmission side) 115.

Furthermore, the optical multiplexer (transmission side) 114 transmits the optical signal obtained through multiplexing to the apparatus (reception side) 300. Specifically, the optical multiplexer (transmission side) 114 accepts from the optical amplifier (transmitting unit, transmission side) 115 optical signals amplified by the optical amplifier (transmitting unit, transmission side) 115. Then, the optical multiplexer (transmission side) 114 transmits the optical signals amplified by the optical amplifier (transmitting unit, transmission side) 115 to the apparatus (reception side) 300.

Still further, when accepting an optical signal from the OSC (transmission side) 119, the optical multiplexer (transmission side) 114 transmits the optical signal accepted from the OSC (transmission side) 119 together with the optical signal obtained through multiplexing to the apparatus (reception side) 300.

The optical amplifier (transmitting unit, transmission side) 115 connects to the optical multiplexer (transmission side) 114. Also, the optical amplifier (transmitting unit, transmission side) 115 amplifies the optical signal. Specifically, the optical amplifier (transmitting unit, transmission side) 115 accepts the optical signal obtained through multiplexing from the optical multiplexer (transmission side) 114. Then, the optical amplifier (transmitting unit, transmission side) 115 collectively amplifies the optical signal obtained through multiplexing. That is, the optical amplifier (transmitting unit, transmission side) 115 performs collective amplification for all wavelengths included in the optical signal. Then, the optical amplifier (transmitting unit, transmission side) 115 sends the amplified optical signal to the optical multiplexer (transmission side) 114. Note that, the optical amplifier (transmitting unit, transmission side) 115 amplifies the optical signal without converting the optical signal to an electrical signal.

The optical demultiplexer (transmission side) 116 connects to the optical amplifier (receiving unit, transmission side) 117 and the OSC (transmission side) 119. Also, the optical demultiplexer (transmission side) 116 connects to the apparatus (reception side) 300 via the optical communication line.

The optical demultiplexer (transmission side) 116 demultiplexes the optical signal obtained through multiplexing. Specifically, the optical demultiplexer (transmission side) 116 accepts the optical signal obtained through multiplexing from the apparatus (reception side) 300. Then, the optical demultiplexer (transmission side) 116 demultiplexes the optical signal accepted from the apparatus (reception side) 300 (optical signal obtained through multiplexing) to a plurality of optical signals. Then, the optical demultiplexer (transmission side) 116 sends the optical signals obtained through demultiplexing to the optical amplifier (receiving unit, transmission side) 117 and the OSC (transmission side) 119.

In more detail, the optical demultiplexer (transmission side) 116 sends to the OSC (transmission side) 119 optical monitoring signal output from an OSC (reception side) 314, which will be explained further below, from among the optical signals obtained through demultiplexing. Also, the optical demultiplexer (transmission side) 116 sends to the optical amplifier (receiving unit, transmission side) 117 all optical signals other than the optical monitoring signal from among the optical signals obtained through demultiplexing.

Figure 3:
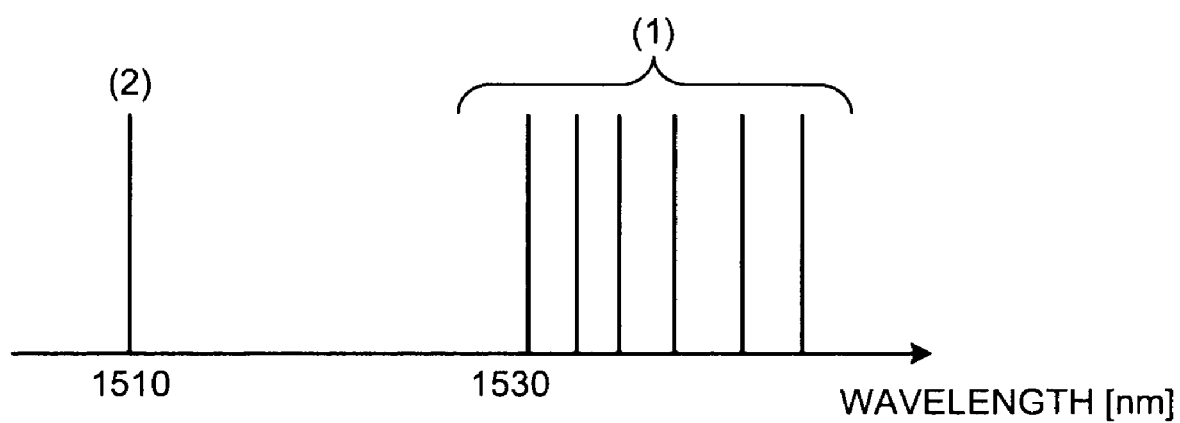
FIG. 3 is a drawing for explaining an example of an optical monitoring signal in the first embodiment.

Here, the optical monitoring signal is a signal used by maintenance staff that maintains the apparatus (transmission side) 100 and the apparatus (reception side) 300. Specifically, as an optical monitoring signal, a signal of a wavelength that is different from a wavelength for use in data transmission and reception is used. An example is explained in which optical signals of wavelengths "1530 nanometers" and larger as depicted in (1) of FIG. 3 are used for data transmission and reception between the apparatus (transmission side) 100 and the apparatus (reception side) 300. In this case, for example, an optical signal of "1510 nanometers" as depicted in (2) of FIG. 3 is used as an optical monitoring signal. FIG. 3 is a drawing for explaining an example of the optical monitoring signal in the first embodiment.

For this reason, by way of example, the optical demultiplexer (transmission side) 116 sends an optical signal of "1510 nanometers" as depicted in (2) of FIG. 3 to the OSC (transmission side) 119. Also, the optical demultiplexer (transmission side) 116 sends optical signals other than those of "1510 nanometers" as depicted in (1) of FIG. 3 to the optical amplifier (receiving unit, transmission side) 117.

Here, in the first embodiment, the case is explained in which the optical demultiplexer sends only the optical monitoring signal is sent to the OSC (transmission side) 119 from among the optical signals obtained through demultiplexing. However, the present invention is not meant to be restricted to this. For example, the optical demultiplexer (transmission side) 116 may send all optical signals obtained through demultiplexing to both of the optical amplifier (receiving unit, transmission side) 117 and the OSC (transmission side) 119.

Also, the optical demultiplexer (transmission side) 116 accepts amplified optical signals from the optical amplifier (receiving unit, transmission side) 117. Then, the optical demultiplexer (transmission side) 116 sends the optical signals accepted from the optical amplifier (receiving unit, transmission side) 117 to the optical switch (receiving unit, transmission side) 118.

The optical amplifier (receiving unit, transmission side) 117 connects to the optical demultiplexer (transmission side) 116. Also, the optical amplifier (receiving unit, transmission side) 117 amplifies optical signals. Specifically, the optical amplifier (receiving unit, transmission side) 117 accepts optical signals from the optical demultiplexer (transmission side) 116, and then collectively amplifies the optical signals.

The optical switch (receiving unit, transmission side) 118 connects to the optical demultiplexer (transmission side) 116 and each of the optical transmitters and receivers (transmission side) 200. Also, the optical switch (receiving unit, transmission side) 118 switches an optical path. Specifically, the optical switch (receiving unit, transmission side) 118 accepts optical signals from the optical demultiplexer (transmission side) 116, and then sends each accepted optical signal to its corresponding optical transmitter and receiver (transmission side) 200.

The OSC (transmission side) 119 connects to the optical demultiplexer (transmission side) 116 and the optical multiplexer (transmission side) 114. Also, upon accepting an optical monitoring signal from the apparatus (reception side) 300, the optical demultiplexer (transmission side) 116 sends the accepted optical monitoring signal to the OSC (transmission side) 119. Furthermore, the OSC (transmission side) 119 sends the optical monitoring signal to the optical multiplexer (transmission side) 114. The optical monitoring signal is then sent from the optical multiplexer (transmission side) 114 to the apparatus (reception side) 300.

[Configuration of the Apparatus (Reception Side)]

Next, an example of the configuration of the apparatus (reception side) 300 is explained. As depicted in FIG. 2, the apparatus (reception side) 300 includes, in particular, an optical demultiplexer (reception side) 311, an optical amplifier (receiving unit, reception side) 312, an optical switch (receiving unit, reception side) 313, and the OSC (reception side) 314. Also, the apparatus (reception side) 300 includes an optical switch (transmitting unit, reception side) 315, optical attenuators (reception side) 316, optical receivers (reception side) 317, an optical multiplexer (reception side) 318, and an optical amplifier (transmitting unit, reception side) 319.

Here, each component in the apparatus (reception side) 300 performs a process similar to that of each component in the apparatus (transmission side) 100. Specifically, the optical demultiplexer (reception side) 311 corresponds to the optical demultiplexer (transmission side) 116, the optical amplifier (receiving unit, reception side) 312 corresponds to the optical amplifier (receiving unit, transmission side) 117, and the optical switch (receiving unit, reception side) 313 corresponds to the optical switch (receiving unit, transmission side) 118.

Also, the OSC (reception side) 314 corresponds to the OSC (transmission side) 119, the optical switch (transmitting unit, reception side) 315 corresponds to the optical switch (transmitting unit, transmission side) 111, the optical attenuator (reception side) 316 corresponds to the optical attenuator (transmission side) 112, the optical receivers (reception side) 317 correspond to the optical receivers (transmission side) 113, the optical multiplexer (reception side) 318 corresponds to the optical multiplexer (transmission side) 114, and the optical amplifier (transmitting unit, reception side) 319 corresponds to the optical amplifier (transmitting unit, transmission side) 115.

Furthermore, for example, the optical demultiplexer (reception side) 311, the optical amplifier (receiving unit, reception side) 312, the optical switch (receiving unit, reception side) 313, and the OSC (reception side) 314 correspond to the receiving unit (reception side) 301 depicted in FIG. 1. Still further, for example, the optical switch (transmitting unit, reception side) 315, the optical attenuators (reception side) 316, the optical receivers (reception side) 317, the optical multiplexer (reception side) 318, the optical amplifier (transmitting unit, reception side) 319, and the OSC (reception side) 314 correspond to the transmitting unit (reception side) 302 depicted in FIG. 1.

The optical transmitters and receivers (reception side) 400 performs processes similar to those of the optical transmitter and receiver (transmission side) 200 except the process using a FEC technique.

Specifically, the optical transmitters and receivers (reception side) 400 as many as the number of channels each accept an optical signal of a wavelength of an assigned channel from the optical switch (receiving unit, reception side) 313. Then, the optical transmitter and receiver (reception side) 400 converts the accepted optical signal to an electrical signal. Then, the optical transmitter and receiver (reception side) 400 converts the electrical signal to an optical signal of the wavelength of the assigned channel. Then, the optical transmitter and receiver (reception side) 400 sends the optical signal to the client (reception side).

Also, specifically, the optical transmitter and receiver (reception side) 400 accepts an optical signal of the wavelength of the assigned channel from the client (reception side). Then, the optical transmitter and receiver (reception side) 400 converts the accepted optical signal to an electrical signal. Then, the optical transmitter and receiver (reception side) 400 converts the electrical signal to an optical signal of the wavelength of the assigned channel. The optical transmitter and receiver (reception side) 400 then sends the optical signal to the optical switch (transmitting unit, reception side) 315.

A process using a FEC technique by the optical transmitter and receiver (reception side) 400 is explained further below, and therefore its explanation is omitted here.

[Configuration of the Optical Transmitter and Receiver (Transmission Side)]

Figure 4A:
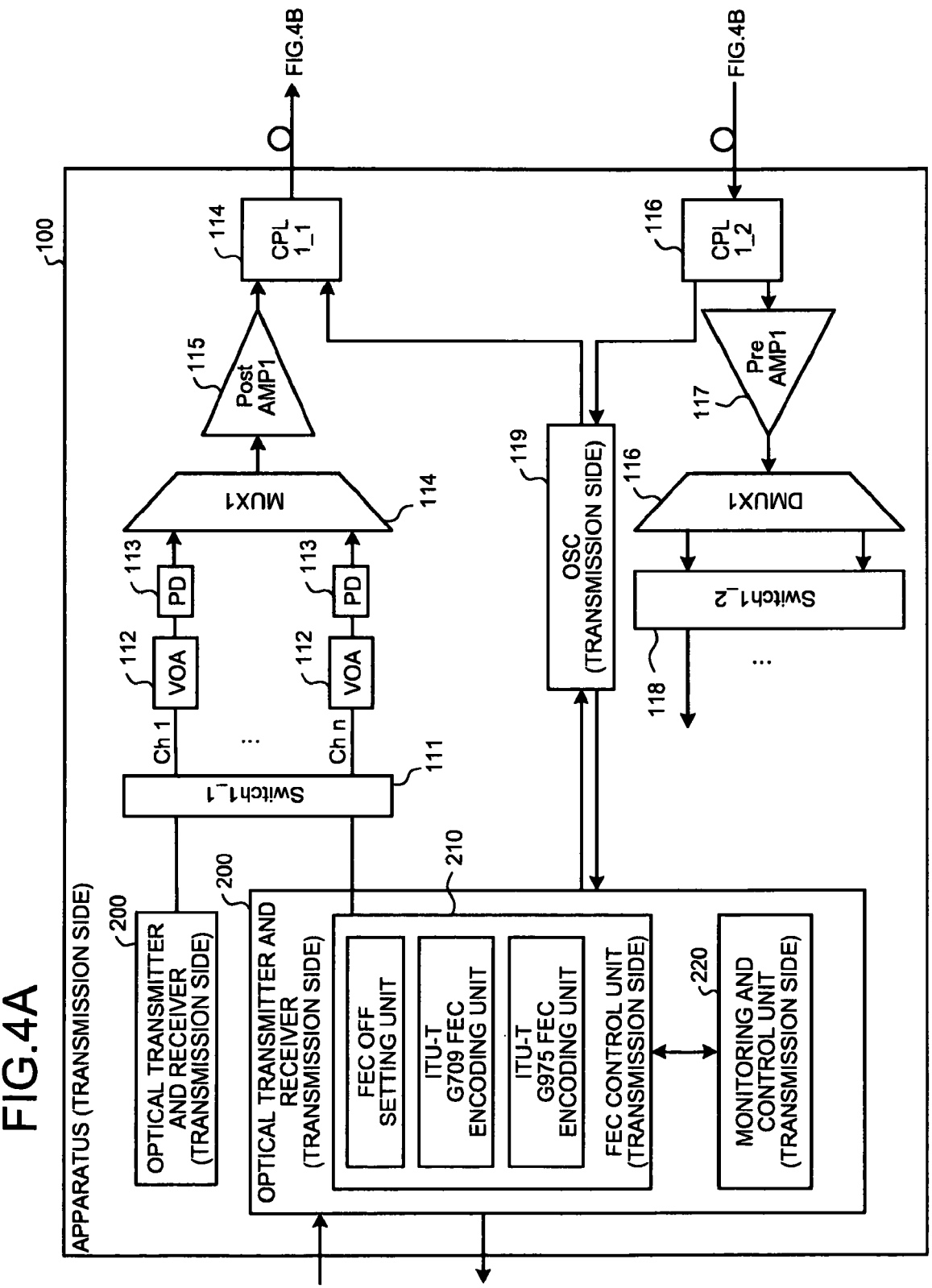
FIG. 4 is a block diagram for explaining an example of the configuration of the optical transmission and reception system in the first embodiment.
Figure 4B:
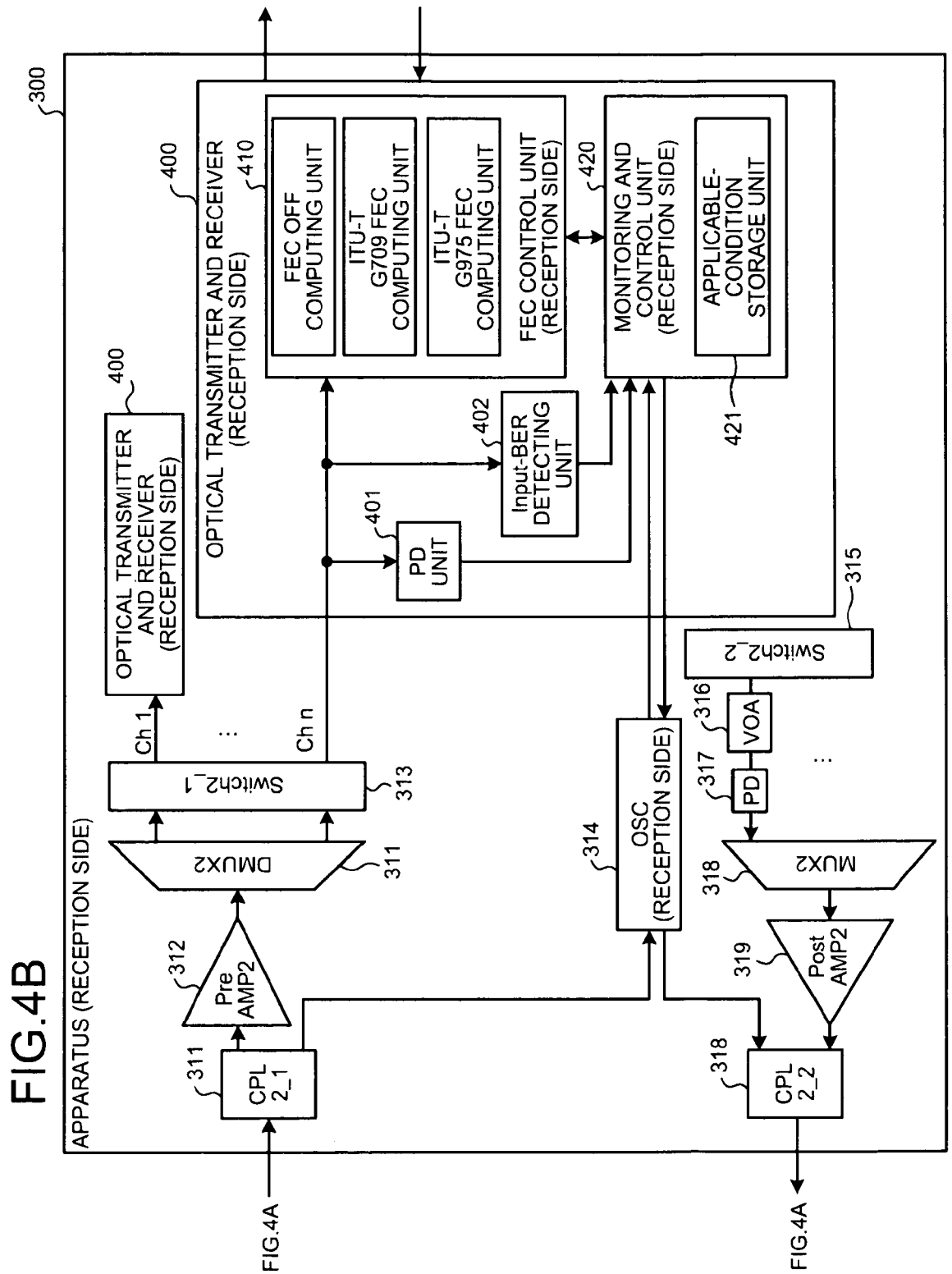

Next, the configuration of the optical transmitter and receiver (transmission side) 200 is explained by using FIG. 4. FIG. 4 is a block diagram for explaining an example of the configuration of the optical transmission and reception system in the first embodiment.

As depicted in FIG. 4, the optical transmitter and receiver (transmission side) 200 includes the FEC control unit (transmission side) 210 and the monitoring and control unit (transmission side) 220.

The FEC control unit (transmission side) 210 connects to the monitoring and control unit (transmission side) 220. Also, the FEC control unit (transmission side) 210 connects to the optical switch (transmitting unit, transmission side) 111 and the optical switch (receiving unit, transmission side) 118. Furthermore, the FEC control unit (transmission side) 210 connects to the client (transmission side).

The FEC control unit (transmission side) 210 performs encoding. Specifically, the FEC control unit (transmission side) 210 uses a FEC technique set by the monitoring and control unit (transmission side) 220 to encode an electrical signal.

In more detail, the FEC control unit (transmission side) 210 receives an optical signal from the optical switch (receiving unit, transmission side) 118. Then, the FEC control unit (transmission side) 210 converts the received optical signal to an electrical signal. Then, the FEC control unit (transmission side) 210 converts the electrical signal to an optical signal and sends the optical signal to the client (transmission side).

Also, the FEC control unit (transmission side) 210 receives an optical signal from the client (transmission side). Then, the FEC control unit (transmission side) 210 converts the received optical signal to an electrical signal. Then, the FEC control unit (transmission side) 210 uses a FEC technique set by the monitoring and control unit (transmission side) 220 to encode the electrical signal. Then, the FEC control unit (transmission side) 210 converts the encoded electrical signal to an optical signal and sends the optical signal to the optical switch (transmitting unit, transmission side) 111.

Here, the FEC technique set by the monitoring and control unit (transmission side) 220 is explained. For example, when a FEC technique using a FEC of an "International Telecommunication Union-Telecommunication Sector (ITU-T) G709 FEC" is set by the monitoring and control unit (transmission side) 220, the FEC control unit (transmission side) 210 uses "ITU-T G709 FEC encoding unit" as depicted in FIG. 4. That is, the FEC control unit (transmission side) 210 converts the optical signal received from the client (transmission side) to an electrical signal. Then, in the FEC control unit (transmission side) 210, the "ITU-T G709 FEC encoding unit" uses "ITU-T G709 FEC" to encode the electrical signal. Then, the FEC control unit (transmission side) 210 converts the encoded electrical signal to an optical signal and sends the optical signal to the optical switch (transmitting unit, transmission side) 111.

Also, for example, when a FEC technique using a FEC of an "ITU-T G975 FEC" is set by the monitoring and control unit (transmission side) 220, the FEC control unit (transmission side) 210 uses "ITU-T G975 FEC encoding unit" as depicted in FIG. 4.

Furthermore, for example, when a FEC technique of a "FEC OFF" is set by the monitoring and control unit (transmission side) 220, the FEC control unit (transmission side) 210 uses "FEC OFF setting unit" as depicted in FIG. 4. That is, for example, the FEC control unit (transmission side) 210 converts an optical signal received from the client (transmission side) to an electrical signal. Then, in the FEC control unit (transmission side) 210, the "FEC OFF setting unit" does not encode the optical signal received from the client (transmission side) by using any FEC. Then, the FEC control unit (transmission side) 210 converts the non-encoded electrical signal as it is to an optical signal and sends the optical signal to the optical switch (transmitting unit, transmission side) 111.

Here, FEC technique "FEC OFF" is a FEC technique of not using any FECs.

The monitoring and control unit (transmission side) 220 connects to the FEC control unit (transmission side) 210. Also, the FEC control unit (transmission side) 210 connects to the OSC (transmission side) 119.

Also, the monitoring and control unit (transmission side) 220 sets a FEC technique to the FEC control unit (transmission side) 210. For example, the monitoring and control unit (transmission side) 220 sets the FEC technique of "FEC OFF" to the FEC control unit (transmission side) 210 as an initial setting for the FEC technique.

Furthermore, for example, the monitoring and control unit (transmission side) 220 sets the FEC technique to be used by the FEC control unit (transmission side) 210 according to the FEC technique reported from the apparatus (reception side) 300. Specifically, for example, the monitoring and control unit (transmission side) 220 accepts an optical monitoring signal from the OSC (transmission side) 119. Then, the monitoring and control unit (transmission side) 220 sets the FEC technique included in the accepted optical monitoring signal as the FEC technique to be used by the FEC control unit (transmission side) 210.

Here, an accept of the FEC technique by the monitoring and control unit (transmission side) 220 is further explained. For example, the monitoring and control unit (transmission side) 220 accepts an optical signal including a FEC technique from the apparatus (reception side) via the optical demultiplexer (transmission side) 116 (in the example depicted in FIG. 4, "CPL1_2") and the OSC (transmission side) 119.

Also, for example, the monitoring and control unit (transmission side) 220 notifies the apparatus (reception side) 300 that the setting has been changed. For example, the FEC technique to be used by the FEC control unit (transmission side) 210 is changed to the FEC technique reported from the apparatus (reception side) 300. After the FEC technique is changed, the monitoring and control unit (transmission side) 220 uses an optical monitoring signal to notify the apparatus (reception side) 300 (the monitoring and control unit (reception side) 420) via the OSC (transmission side) 119 of information indicating that the FEC technique (switching-completed signal) has been changed.

Here, reporting of a switching-completed signal by the monitoring and control unit (transmission side) 220 is further explained. For example, the monitoring and control unit (transmission side) 220 sends to the OSC (transmission side) 119 an optical monitoring signal including a switching-completed signal. The optical monitoring signal sent by the monitoring and control unit (transmission side) 220 to the OSC (transmission side) 119 is reported to the apparatus (reception side) 300 via the optical multiplexer (transmission side) 114 (in the example depicted in FIG. 4, "CPL1_1").

[Configuration of the Optical Transmitter and Receiver (Reception Side)]

Next, the configuration of the optical transmitter and receiver (reception side) is explained by using FIG. 4. The optical transmitter and receiver (reception side) 400 includes a Photo Detector (PD) unit 401, the Input-BER detecting unit 402, a FEC control unit (reception side) 410, and a monitoring and control unit (reception side) 420. Also, the optical transmitter and receiver (reception side) 400 includes an applicable-condition storage unit 421 in the monitoring and control unit (reception side) 420.

Figures 5, 6:
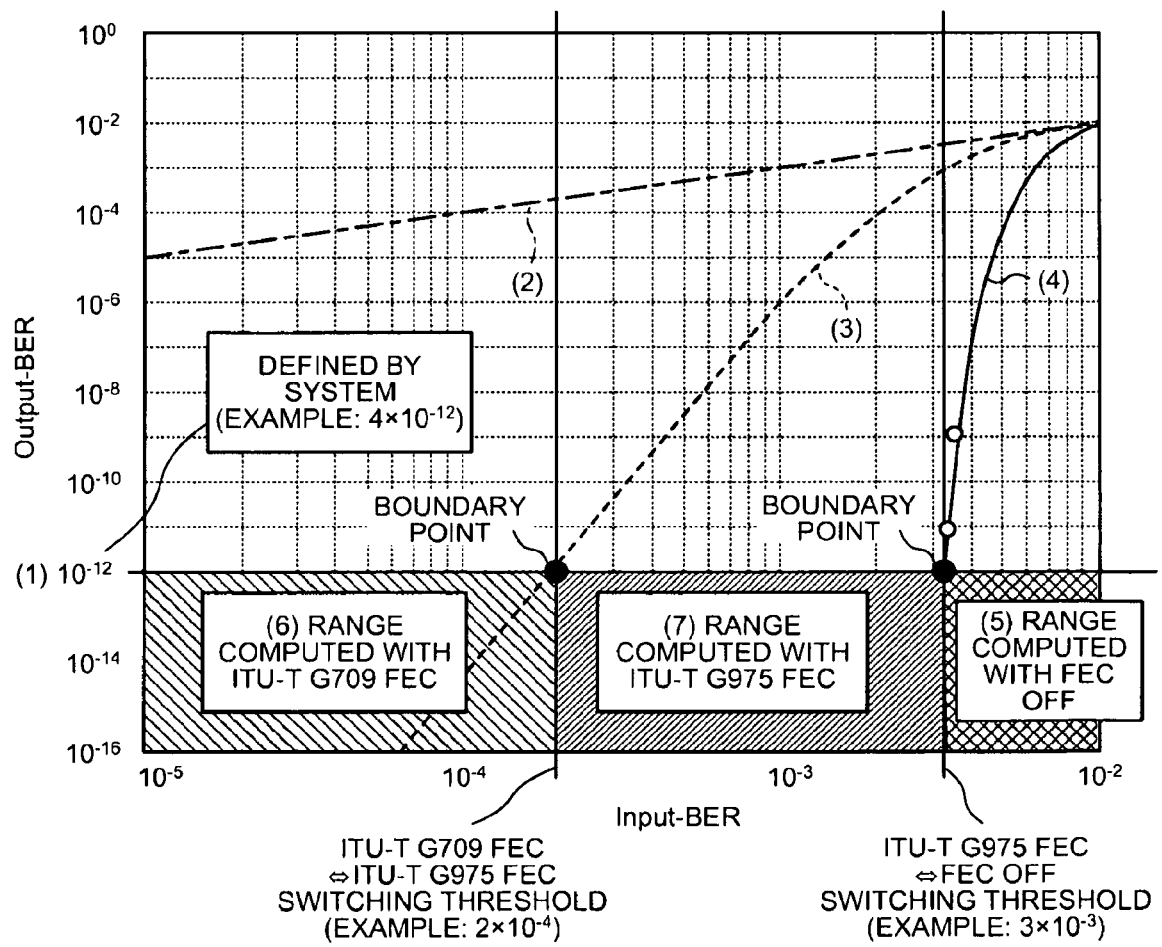
FIG. 5 is a drawing for explaining an example of information stored in an applicable-condition storage unit in the first embodiment.
FIG. 6 is a drawing for explaining applicable conditions associated with FEC techniques in the first embodiment.

The applicable-condition storage unit 421 is placed in the monitoring and control unit (reception side) 420. Also, the applicable-condition storage unit 421 has stored therein applicable conditions for FEC techniques, as depicted in FIG. 5. Specifically, as an applicable condition, the applicable-condition storage unit 421 has stored therein a predetermined range of ratios of errors included in the data received by the optical transmitter and receiver (reception side) 400. FIG. 5 is a drawing for explaining an example of information stored in the applicable-condition storage unit 421 in the first embodiment.

In the first embodiment, the case is explained in which the applicable-condition storage unit 421 is placed in the monitoring and control unit (reception side) 420. However, the present invention is not meant to be restricted to this. For example, the applicable-condition storage unit 421 may be placed outside of the monitoring and control unit (reception side) 420.

Specifically, by using the example depicted in FIG. 5 for explanation, the applicable-condition storage unit 421 has stored therein an applicable condition "$1 \times 10^{-12}$ to $2 \times 10^{-4}$" in association with the FEC technique "ITU-T G709 FEC". Also, similarly, the applicable-condition storage unit 421 has stored therein an applicable condition "$3 \times 10^{-3}$ to $2 \times 10^{-4}$" in association with the FEC technique "ITU-T G975 FEC". Furthermore, for example, the applicable-condition storage unit 421 has stored therein an applicable condition "to $1 \times 10^{-12}$" and "$3 \times 10^{-3}$ to" in association with the FEC technique "FEC OFF".

Here, each applicable condition stored in the applicable-condition storage unit 421 is set in advance by maintenance staff. For example, each applicable condition is input by maintenance staff at the time of the initial start (for example, at the time of initial power activation) of the apparatus (reception side) 300. Also, a correspondence between the FEC techniques and the applicable conditions stored in the applicable-condition storage unit 421 is used by the monitoring and control unit (reception side) 420.

The applicable conditions associated with the FEC technique "FEC OFF" are explained by using FIG. 6. As indicated by (1) of FIG. 6, as for the ratio of errors included in data received by the optical transmitter and receiver (reception side), it is assumed for explanation that a ratio allowed by maintenance staff (allowable ratio) is "$1 \times 10^{-12}$". The allowable ratio is set for each optical transmission and reception system by maintenance staff using the apparatus (transmission side) 100 and the apparatus (reception side) 300. FIG. 6 is a drawing for explaining applicable conditions associated with FEC techniques in the first embodiment.

For example, as an applicable condition associated with the FEC technique "FEC OFF", the applicable-condition storage unit 421 has stored therein a range of error rates incapable of recovering from an error to achieve the allowable ratio even by using FEC.

Here, FIG. 6 is briefly explained. In FIG. 6, the horizontal axis ("Input-BER" in FIG. 6) represents pre-application ratios, whilst the vertical axis ("Output-BER" in FIG. 6) represents post-application ratios. The pre-application ratio indicates a ratio of errors included in data in a reception state (no FEC technique is applied). The post-application ratio indicates a ratio of errors included in data after any FEC technique is applied.

Also, three curves depicted in FIG. 6 each represent a correspondence between the pre-application ratio and the post-application ratio when any FEC technique is applied. For example, the curve indicated by (2) in FIG. 2 indicates a correspondence depicting BER characteristics for the FEC technique "FEC OFF". For example, when the pre-application ratio is "$1 \times 10^{-4}$", the post-application ratio is "$1 \times 10^{-4}$".

Also, for example, the curve indicated by (3) in FIG. 2 indicates a correspondence depicting BER characteristics for the FEC technique "ITU-T G709 FEC". For example, when the pre-application ratio is "$3 \times 10^{-4}$", the post-application ratio exceeds "$1\times10^{-12}$". Furthermore, for example, the curve indicated by (4) in FIG. 2 indicates a correspondence depicting BER characteristics for the FEC technique "ITU-T G975 FEC". For example, when the pre-application ratio is "$5\times10^{-3}$", the post-application ratio exceeds "$1\times10^{-12}$".

Still further, for example, as indicated by (5) of FIG. 6, the applicable-condition storage unit 421 has stored therein an applicable condition "$3\times10^{-3}$ to" in association with the FEC technique "FEC OFF".

That is, even "ITU-T G975 FEC", which is the highest in error recovery performance, is used for a ratio of errors of "$5\times10^{-3}$" (a ratio larger than "$3\times10^{-3}$"), the ratio of errors after recover exceeds "$1\times10^{-12}$". As a result, when the ratio of errors included in the data is larger than "$3\times10^{-3}$", the allowable ratio cannot be achieved even by using FEC for error recovery. Thus, the FEC technique "FEC OFF" is set.

Also, for example, the applicable-condition storage unit 421 has stored therein a range of ratios of errors included in the reception data as an applicable condition associated with the FEC technique "FEC OFF". Specifically, for example, the applicable-condition storage unit 421 has stored therein an applicable condition "$-1\times10^{-12}$" in association with the FEC technique "FEC OFF".

Furthermore, for example, the applicable-condition storage unit 421 has stored therein an applicable condition "$1\times10^{-12}$ to $2\times10^{-4}$" as an applicable condition associated with the FEC technique "ITU-T G709 FEC". Still further, for example, as indicated by (7) of FIG. 6, the applicable-condition storage unit 421 has stored therein an applicable condition "$2\times10^{-4}$ to $3\times10^{-3}$" as an applicable condition associated with the FEC technique "ITU-T G975 FEC". That is, a threshold for switching between the FEC technique "ITU-T G709 FEC" and the "ITU-T G975 FEC" is "$2\times10^{-4}$". Furthermore, a threshold for switching between the FEC technique "ITU-T G975 FEC" and "FEC OFF" is "$3\times10^{-3}$".

Referring back to FIG. 4, the PD unit 401 (hereinafter, also referred to as "input-break measuring unit") connects to the monitoring and control unit (reception side) 420. Also, the PD unit 401 connects to the optical switch (transmitting unit, reception side) 315.

Furthermore, the PD unit 401 measures to determine whether the data reception state indicates an input break. Specifically, the PD unit 401 always measures an optical signal sent from the optical switch (transmitting unit, reception side) 315 to the optical transmitter and receiver (reception side) 400 to determine whether there is an input break. When determining that there is an input break, the PD unit 401 sends a switching-completed signal to the monitoring and control unit (reception side) 420.

The Input-BER detecting unit 402 (hereinafter, also referred to as "measuring unit") connects to the monitoring and control unit (reception side) 420. Also, the Input-BER detecting unit 402 connects to the optical switch (transmitting unit, reception side) 315.

Furthermore, the Input-BER detecting unit 402 measures a data reception state. Specifically, the Input-BER detecting unit 402 measures a ratio of errors included in the data received by the optical transmitter and receiver (reception side) 400. In more detail, the Input-BER detecting unit 402 always measures an optical signal sent from the optical switch (transmitting unit, reception side) 315 to the optical transmitter and receiver (reception side) 400, thereby always measuring a ratio of errors included in the data. Every time measuring a ratio of errors included in the data, the Input-BER detecting unit 402 sends the ratio to the monitoring and control unit (reception side) 420.

The FEC control unit (reception side) 410 connects to the monitoring and control unit (reception side) 420. Also, the FEC control unit (reception side) 410 connects to the optical switch (transmitting unit, reception side) 315. Furthermore, the FEC control unit (reception side) 410 connects to the client (reception side).

Still further, the FEC control unit (reception side) 410 recovers data by using a FEC technique. Specifically, the FEC control unit (reception side) 410 uses the FEC technique set by the monitoring and control unit (reception side) 420 to recover from errors included in the reception data.

In more detail, the FEC control unit (reception side) 410 receives an optical signal from the optical switch (transmitting unit, reception side) 315. Then, the FEC control unit (reception side) 410 converts the received optical signal to an electrical signal. Then, the FEC control unit (reception side) 410 uses the FEC technique set by the monitoring and control unit (reception side) 420 to recover from errors included in the reception data. Then, the FEC control unit (reception side) 410 converts the data recovered from errors to an optical signal and sends the optical signal to the client (reception side).

Also, the FEC control unit (reception side) 410 receives an optical signal from the client (reception side). Then, the FEC control unit (reception side) 410 converts the received optical signal to an electrical signal. Then, the FEC control unit (reception side) 410 converts the electrical signal to an optical signal and sends the optical signal to the optical switch (transmitting unit, reception side) 315.

Here, the FEC control unit (reception side) 410 is explained in view of the FEC technique set by the monitoring and control unit (reception side) 420. For example, when a FEC technique using FEC "ITU-T G709 FEC" is set by the monitoring and control unit (reception side) 420, as depicted in FIG. 4, the FEC control unit (reception side) 410 uses an "ITU-T G709 FEC computing unit". That is, the FEC control unit (reception side) 410 converts an optical signal received from the optical switch (receiving unit, reception side) 313 to an electrical signal. Then, in the FEC control unit (reception side) 410, an "ITU-T G709 FEC encoding unit" uses the FEC technique "ITU-T G709 FEC" to recover from data errors included in the electrical signal.

The monitoring and control unit (reception side) 420 (hereinafter, also referred to as "technique selecting unit", "notifying unit", or "input-break notifying unit") connects to the PD unit 401, the Input-BER detecting unit 402, and the FEC control unit (reception side) 410. Also, the monitoring and control unit (reception side) 420 connects to the OSC (reception side) 314.

Furthermore, the monitoring and control unit (reception side) 420 sets a FEC technique in the FEC control unit (reception side) 410. Specifically, as explained below, the monitoring and control unit (reception side) 420 selects a FEC technique according to the data reception state. Still further, the monitoring and control unit (reception side) 420 notifies the apparatus (transmission side) 100 of the selected FEC technique. Still further, the monitoring and control unit (reception side) 420 sets the selected FEC as the FEC technique for use by the FEC control unit (reception side) 410.

First, the monitoring and control unit (reception side) 420 is explained in view of selecting a FEC technique according to the data reception state. The monitoring and control unit (reception side) 420 determines an applicable condition satisfying the data reception state measured by the Input-BER detecting unit 402 from among the applicable conditions stored in the applicable-condition storage unit 421. Then, the monitoring and control unit (reception side) 420 selects the FEC technique stored in association with the applicable condition determined in the applicable-condition storage unit 421.

In more detail, the monitoring and control unit (reception side) 420 determines a range including the ratio of errors measured by the Input-BER detecting unit 402 from among the ratios of errors stored as applicable conditions in the applicable-condition storage unit 421. Then, the monitoring and control unit (reception side) 420 selects an FEC technique in association with the determined range stored in the applicable-condition storage unit 421.

For example, when the ratio of errors included in the reception data is "$1\times10^{-5}$", the monitoring and control unit (reception side) 420 determines that the applicable condition satisfying the ratio or errors is "$1\times10^{-12}$ to $2\times10^{-4}$". Then, the monitoring and control unit (reception side) 420 selects the FEC technique "ITU-T G709 FEC" associated with the applicable condition "$1\times10^{-12}$ to $2\times10^{-4}$" (refer to FIG. 4).

Also, specifically, when the PD unit 401 measures to determine that there is an input break, the monitoring and control unit (reception side) 420 selects "FEC OFF" as a FEC technique. For example, the monitoring and control unit (reception side) 420 accepts information indicative of an input break from the PD unit 401. Then, the monitoring and control unit (reception side) 420 selects "FEC OFF" as a FEC technique (refer to FIG. 4).

Here, for example, the monitoring and control unit (reception side) 420 always performs the FEC-technique selecting process explained above.

The monitoring and control unit (reception side) 420 is further explained in view of notifying the apparatus (transmission side) 100 of the selected FEC technique. Upon selecting a FEC technique, the monitoring and control unit (reception side) 420 uses an optical monitoring signal to notify the apparatus (transmission side) 100 of the selected FEC technique. An exemplary case is explained in which the FEC technique "ITU-T G709 FEC" is selected. The monitoring and control unit (reception side) 420 uses an optical monitoring signal to notify the apparatus (transmission side) 100 (monitoring and control unit (transmission side) 220) via the OSC (reception side) 314 of the FEC technique "ITU-T G709 FEC".

Another exemplary case is explained in which the FEC technique "FEC OFF" is selected. The monitoring and control unit (reception side) 420 uses an optical monitoring signal to notify the apparatus (transmission side) 100 via the OSC (reception side) 314 of the FEC technique (FEC OFF).

Here, notification of the FEC technique by the monitoring and control unit (reception side) 420 is further explained. For example, the monitoring and control unit (reception side) 420 notifies the apparatus (transmission side) 100 via the OSC (reception side) 314 and the optical multiplexer (reception side) 318 (in the example depicted in FIG. 4, "CPL2_2") of the optical monitoring signal including the FEC technique.

The monitoring and control unit (reception side) 420 is still further explained in view of setting the selected FEC technique as the FEC technique for use by the FEC control unit (reception side) 410. For example, after notifying the apparatus (transmission side) 100 of the selected FEC technique, the monitoring and control unit (reception side) 420 accepts an optical monitoring signal from the apparatus (transmission side) 100 via the OSC (transmission side) 119. Then, when the accepted optical monitoring signal includes a switching-completed signal, the monitoring and control unit (transmission side) 220 changes the selected FEC technique to the FEC technique for use by the FEC control unit (reception side) 410.

Here, in the present embodiment, the scheme is explained in which, after accepting the information indicating that the FEC technique has been changed, the monitoring and control unit (reception side) 420 changes the FEC technique of the FEC control unit (reception side) 410. However, the present invention is not meant to be restricted to this. For example, when selecting a FEC technique, the monitoring and control unit (reception side) 420 may change the FEC technique of the FEC control unit (reception side) 410 and also may notify the apparatus (transmission side) 100 of the FEC technique. Also, for example, upon selecting a FEC technique, the monitoring and control unit (reception side) 420 may notify the apparatus (transmission side) 100 of the FEC technique and, after a predetermined time elapses, may change the FEC technique of the FEC control unit (reception side) 410.

Here, an acceptance of the switching-completed signal by the monitoring and control unit (reception side) 420 is further explained. For example, the monitoring and control unit (reception side) 420 accepts an optical monitoring signal including a switching-completed signal via the optical demultiplexer (reception side) 311 (in the example depicted in FIG. 4, "CPL2_1") and the OSC (reception side) 314.

[Process by the Optical Transmitter and Receiver]

Figure 7A:
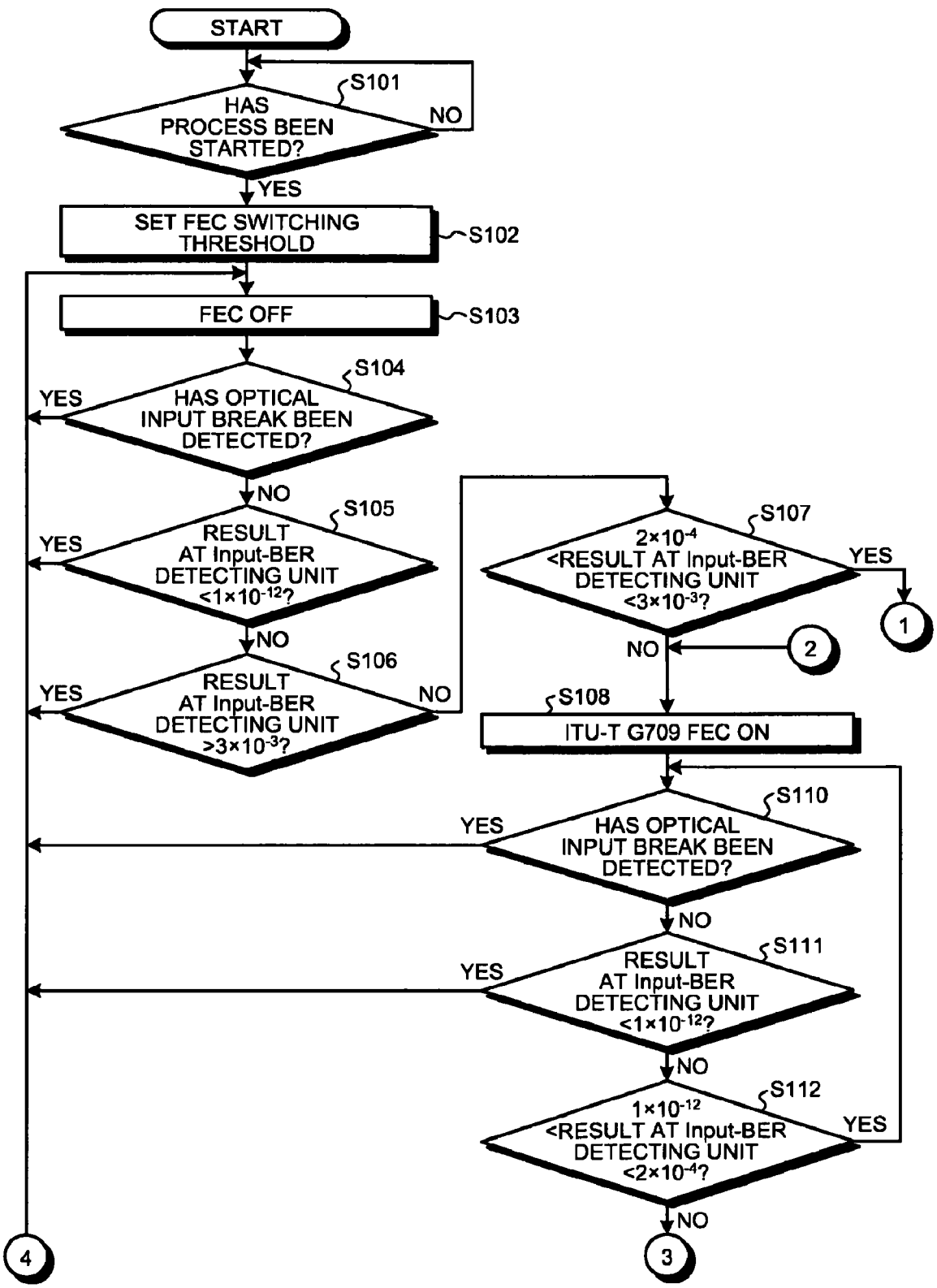
FIG. 7 is a flowchart for explaining an example of a FEC-technique switching process by an optical transmitter and receiver in the first embodiment.
Figure 7B:
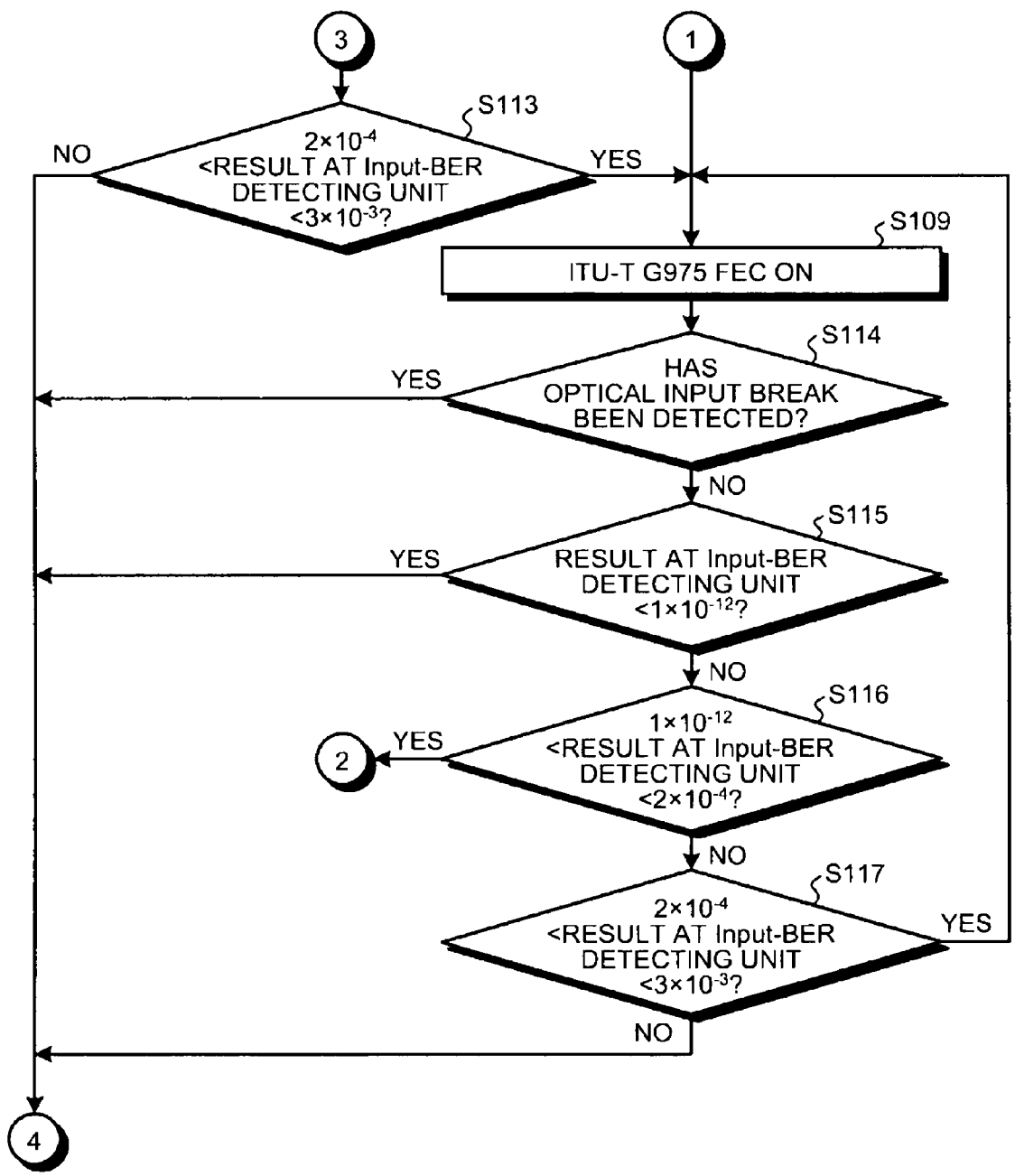

Next, an example of a FEC-technique changing process by the optical transmitter and receiver is explained by using FIG. 7. FIG. 7 is a flowchart for explaining an example of the FEC-technique switching process by the optical transmitter and receiver in the first embodiment.

As depicted in FIG. 7, when the optical transmission and reception system is activated to start the process ("Yes" at step S101), the optical transmitter and receiver (reception side) 400 sets a FEC switching threshold (step S102). Specifically, in the optical transmitter and receiver (reception side) 400, an applicable condition is input by maintenance staff to the applicable-condition storage unit 421.

Then, the optical transmitter and receiver (transmission side) 200 and the optical transmitter and receiver (reception side) 400 each set its initial setting for the FEC technique is "FEC OFF" (step S103).

Then, the monitoring and control unit (reception side) 420 determines whether an input break has been detected (step S104). Specifically, the monitoring and control unit (reception side) 420 determines whether information indicative of an input break has been accepted from the PD unit 401. Here, if an input break has been detected ("Yes" at step S104), the monitoring and control unit (reception side) 420 keeps the FEC technique "FEC OFF" as it is (step S103).

If an input break has not been detected ("No" at step S104), the monitoring and control unit (reception side) 420 determines whether the detection result obtained by the Input-BER detecting unit 402 is smaller than "$1\times10^{-12}$", (step S105). Specifically, the monitoring and control unit (reception side) 420 determines whether the error ratio measured by the Input-BER detecting unit 402 is smaller than "$1\times10^{-12}$". When determining that the detection result obtained by the Input-BER detecting unit 402 is smaller than "$1\times10^{-12}$", ("Yes" at step S105), the monitoring and control unit (reception side) 420 keeps the FEC technique "FEC OFF" as it is (step S103).

When not determining that determining that the detection result obtained by the Input-BER detecting unit 402 is smaller than "$1\times10^{-2}$", ("No" at step S105), the monitoring and control unit (reception side) 420 determines whether the detection result is larger than "$3\times10^{-3}$", (step S106). When determining that the detection result obtained by the Input-BER detecting unit 402 is larger than "$3\times10^{-3}$" ("Yes" at step S106), the monitoring and control unit (reception side) 420 keeps the FEC technique "FEC OFF" as it is (step S103).

When not determining that the detection result obtained by the Input-BER detecting unit 402 is larger than "$3 \times 10^{-3}$" ("No" at step S106), the monitoring and control unit (reception side) 420 determines whether the detection result is between "$2 \times 10^{-4}$" and "$3 \times 10^{-3}$", (step S107). When determining that the detection result obtained by the Input-BER detecting unit 402 is not between "$2 \times 10^{-4}$" and "$3 \times 10^{-3}$" ("No" at step S107), the monitoring and control unit (reception side) 420 selects the FEC technique "ITU-T G709 FEC". Then, the monitoring and control unit (reception side) 420 sets (switches to) "ITU-T G709 FEC" as a FEC technique for use by the FEC control unit (reception side) 410 (step S108).

When determining that the detection result obtained by the Input-BER detecting unit 402 is between "$2 \times 10^{-4}$" and "$3 \times 10^{-3}$" ("No" at step S106 and "Yes" at step S107), the monitoring and control unit (reception side) 420 selects the FEC technique "ITU-T G975 FEC". Then, the monitoring and control unit (reception side) 420 sets (switches to) "ITU-T G975 FEC" as a FEC technique for use by the FEC control unit (reception side) 410 (step S109).

Here, after performing the FEC technique (step S103, S108, or S109), the monitoring and control unit (reception side) 420 repeats a process of determining whether to change the FEC technique. For example, when determining the FEC technique "FEC OFF" (step S103), the monitoring and control unit (reception side) 420 repeats the processes from step S104 to step S107.

Also, similarly, for example, when determining the FEC technique "ITU-T G709 FEC" (step S108), the monitoring and control unit (reception side) 420 performs processes similar to those at steps S104 and S105 (steps S110 and S111). Then, the monitoring and control unit (reception side) 420 determines whether the detection result obtained by the Input-BER detecting unit 402 is within "$1 \times 10^{-12}$ to $2 \times 10^{-4}$" (step S112). When determining that the detection result obtained by the Input-BER detecting unit 402 is within "$1 \times 10^{-12}$ to $2 \times 10^{-4}$", ("Yes" at step S112), the monitoring and control unit (reception side) 420 keeps the FEC technique "ITU-T G709 FEC" as it is. Then, the processes from step S110 to step S112 are repeated. On the other hand, when determining that the detection result obtained by the Input-BER detecting unit 402 is not within "$1 \times 10^{-12}$ to $2 \times 10^{-4}$" ("No" at step S112), the monitoring and control unit (reception side) 420 performs a process similar to that at step S107 (step S113). Here, when determining that the detection result obtained by the Input-BER detecting unit 402 is between "$2 \times 10^{-4}$" and "$3 \times 10^{-3}$", the monitoring and control unit (reception side) 420 sets the FEC technique "ITU-T G975 FEC" (step S109). When determining that the detection result obtained by the Input-BER detecting unit 402 is not between "$2 \times 10^{-4}$" and "$3 \times 10^{-3}$", the monitoring and control unit (reception side) 420 sets the FEC technique "FEC OFF" (step S103).

Similarly, for example, when setting the FEC technique "ITU-T G975 FEC" (step S109), the monitoring and control unit (reception side) 420 performs processes similar to those from step S110 to step S113 (steps S114 to S117).

Effects of the First Embodiment

As explained above, according to the first embodiment, the applicable-condition storage unit 421 has stored in advance a FEC technique applicable at the optical transmitter and receiver (transmission side) 200 and an applicable condition in association with each other. The optical transmitter and receiver (reception side) 400 measures a state of receiving data transmitted from the optical transmitter and receiver (transmission side) 200. Also, the optical transmitter and receiver (reception side) 400 determines an applicable condition satisfied by the measured data reception state from among the applicable conditions stored in the applicable-condition storage unit 421. The optical transmitter and receiver (reception side) 400 then selects the technique associated with the determined applicable condition stored in the applicable-condition storage unit 421. The optical transmitter and receiver (reception side) 400 then notifies the optical transmitter and receiver (transmission side) 200 of the selected FEC technique. As a result, according to the first embodiment, power consumption can be reduced.

Specifically, in these days, environmental issues are recognized as worldwide issues, and also company's social responsibility is taken seriously. In view of social responsibility, it is desired not to waste power. In the conventional technique, in an optical transmitter and receiver with an FEC (error correction) function, the setting for FEC is often unchanged for operation once after being set. Therefore, for example, in the conventional optical transmitter and receiver, even when an optical input thereto breaks, an error rate incapable of error correction is input, or the transmission quality is good enough to dispense with error correction, the FEC function always operates depending on the setting by the customer. With this, the conventional optical transmitter and receiver always wastes power by consuming power for operation FEC function.

Moreover, for example, in the conventional technique, a FEC technique that is inappropriate in view of power consumption is often used without being replaced. With this, the optical transmitter and receiver in the conventional technique consumes more power than power that would be consumed if an appropriate FEC technique is used.

Figure 8:
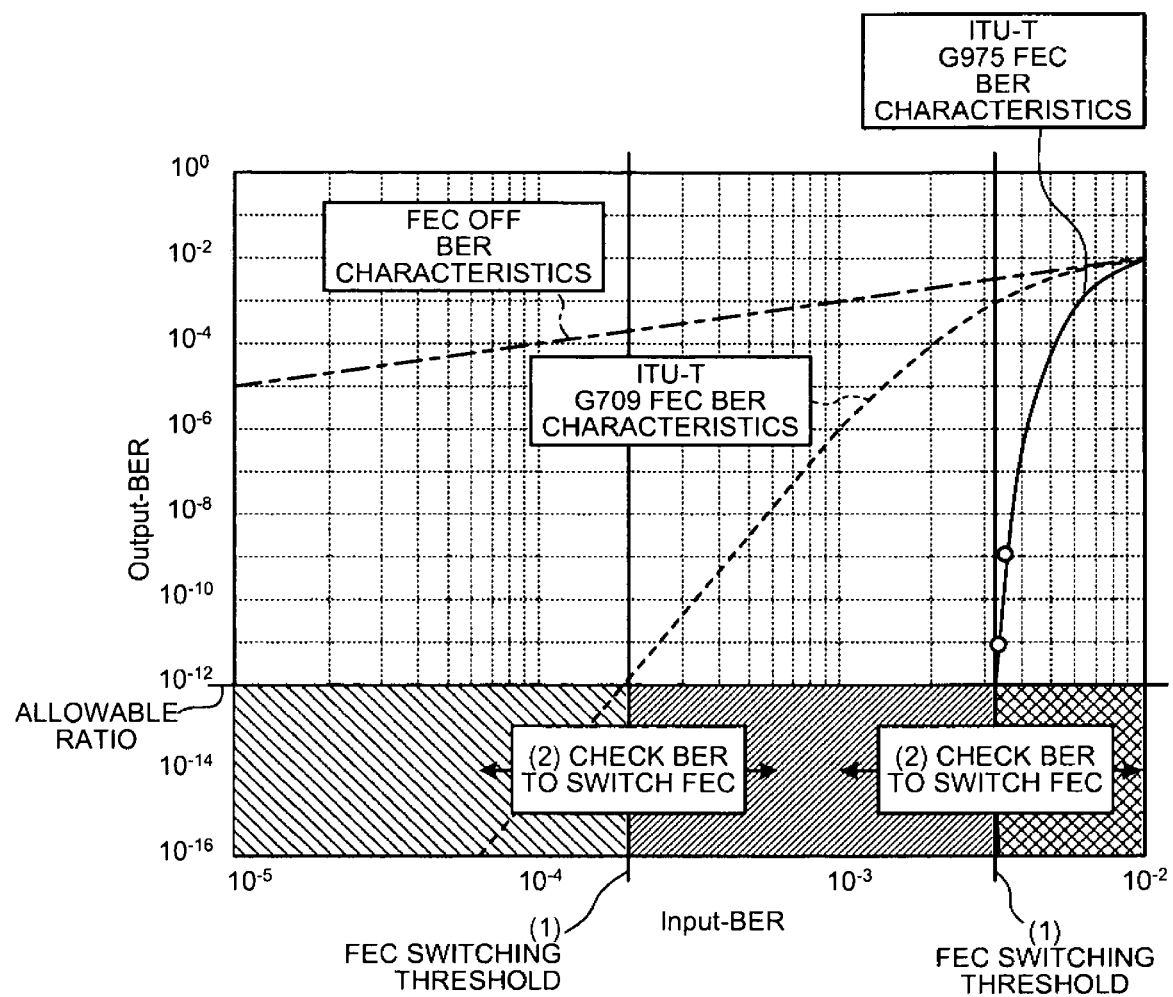
FIG. 8 is a drawing for explaining an effect by the optical transmission and reception system according to the first embodiment.

Compared with the conventional technique, the optical transmitter and receptor disclosed herein can use an appropriate FEC technique according to the data reception state, thereby reducing power consumption. For example, as depicted in FIG. 8, when the ratio of errors included in the data exceeds a switching threshold indicated by (1) of FIG. 8, the FEC technique can be changed as indicated by (2) of FIG. 8. With this, an appropriate FEC technique can be used according to the data reception state, thereby reducing power consumption. FIG. 8 is a drawing for explaining an effect by the optical transmission and reception system according to the first embodiment.

Also, in the conventional technique, the setting for FEC is often unchanged for operation once after being set. Therefore, in the conventional technique, even if the error rate deteriorates due to line degradation, the FEC technique cannot be immediately switched, and therefore the transmission quality cannot be ensured.

Compared with the conventional technique, the optical transmitter and receptor disclosed herein can switch the FEC technique according to the error rate, thereby ensuring the transmission quality and reducing power consumption at the time of using the FEC function.

Furthermore, according to the first embodiment, the applicable-condition storage unit 421 has stored therein a correspondence between a range of ratios of errors incapable of recovering from errors to achieve the allowable ratio even by using FEC and a technique of not applying FEC, as a correspondence between an applicable condition and a FEC technique. With this, according to the first embodiment, when it is impossible to recover from errors to achieve the ratio of errors set in advance and allowable by the maintenance staff even by using FEC, a technique of not using any FEC is selected, thereby reducing power consumption.

Furthermore, according to the first embodiment, when the data reception state indicates an input break, the counterpart optical transmitter and receiver is notified of the technique of not using FEC. With this, according to the first embodiment, in the case of an input break, the technique of not using any FEC is selected, thereby reducing power consumption.

[b] Second Embodiment

Meanwhile, in the foregoing, the technique has been explained as a first embodiment in which the ranges of error ratios for use as an applicable condition are input in advance by maintenance staff. However, the present invention is not meant to be restricted to this. For example, an allowable ratio may be accepted from maintenance staff and, from the accepted allowable ratio, each applicable condition may be calculated by an optical transmitting and receiving apparatus.

In the following, as a second embodiment, a technique is explained by using FIGS. 9 to 12 in which an allowable ratio is accepted from maintenance staff and each applicable condition is calculated by an optical transmitting and receiving apparatus from the accepted allowable ratio. In the following, portions similar to those in the optical transmitter and receiver according to the first embodiment are only briefly explained or not explained herein.

Figure 9A:
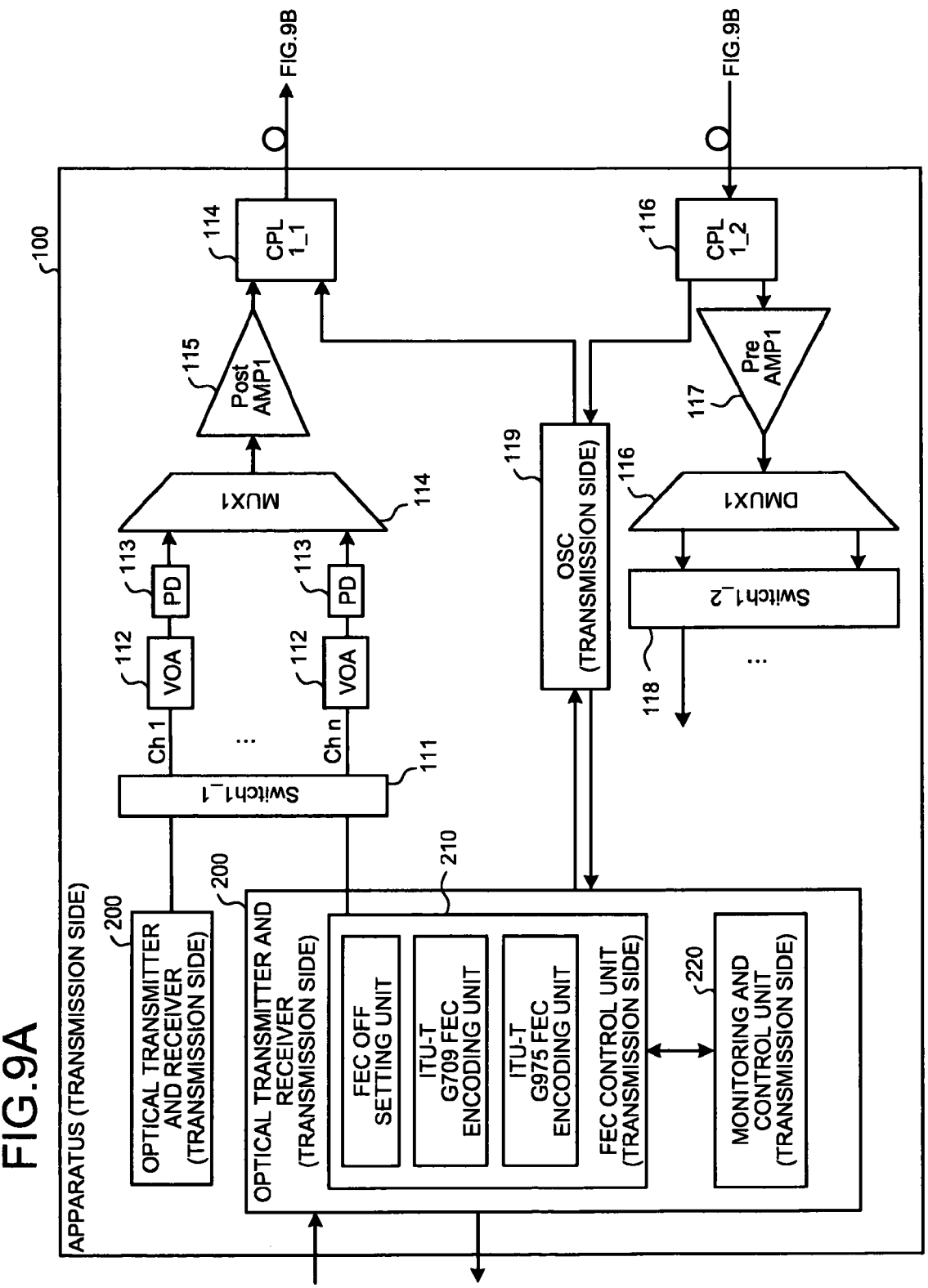
FIG. 9 is a block diagram for explaining an example of an optical transmission and reception system in a second embodiment.

Specifically, the optical transmitter and receiver (reception side) 400 in the second embodiment includes, in addition to the components depicted in FIG. 4, a relation storage unit 501, an accepting unit 502, a reading unit 503, and a setting unit 504, as depicted in FIG. 9. In the example depicted in FIG. 9, the relation storage unit 501 connects to the accepting unit 502. Also, the accepting unit 502 connects to the reading unit 503. Furthermore, the reading unit 503 connects to the relation storage unit 501, the accepting unit 502, and the setting unit 504. Still further, the setting unit 504 connects to the reading unit 503 and the applicable-condition storage unit 421. FIG. 9 is a block diagram of an example of an optical transmission and reception system in the second embodiment.

Here, in the second embodiment, the relation storage unit 501 has stored therein a correspondence between a pre-application ratio and a post-application ratio for each FEC technique. Here, the pre-application ratio indicates a ratio of errors included in data in a reception state (no FEC technique is applied in the apparatus (reception side) 300). The post-application ratio indicates a ratio of errors included in data after any FEC technique is applied.

Figure 10:
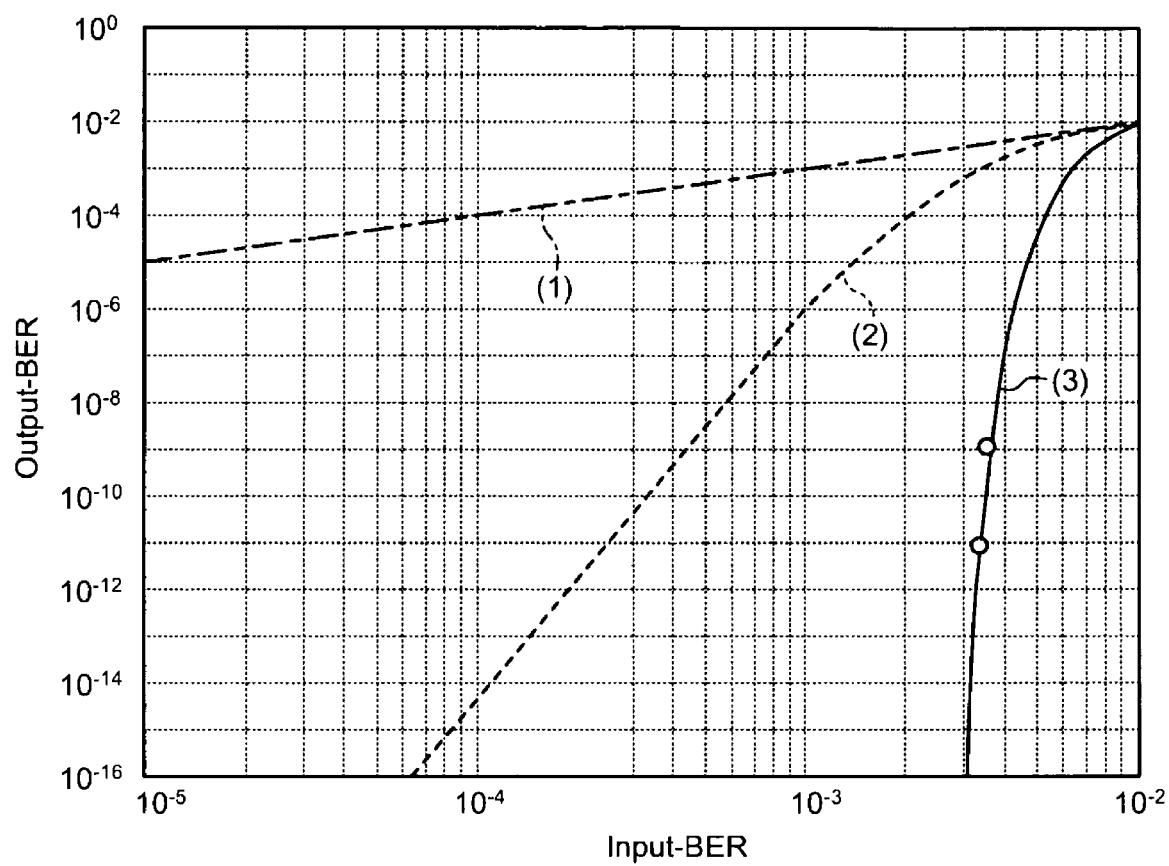
FIG. 10 is a drawing for explaining correspondences stored in a relation storage unit in the second embodiment.

For example, as indicated by (1) of FIG. 10, the relation storage unit 501 has stored therein a correspondence for the FEC technique "FEC OFF". Also, as indicated by (2) of FIG. 10, the relation storage unit 501 has stored therein a correspondence for the FEC technique "ITU-T G709 FEC". Furthermore, as indicated by (3) of FIG. 10, the relation storage unit 501 has stored therein a correspondence for the FEC technique "ITU-T G975 FEC". FIG. 10 is a drawing for explaining a correspondence stored in the relation storage unit 501 in the second embodiment.

In the second embodiment, the accepting unit 502 accepts an allowable ratio from maintenance staff. For example, the accepting unit 502 accepts from the maintenance staff an allowable ratio "$1\times10^{-12}$".

Figure 11:
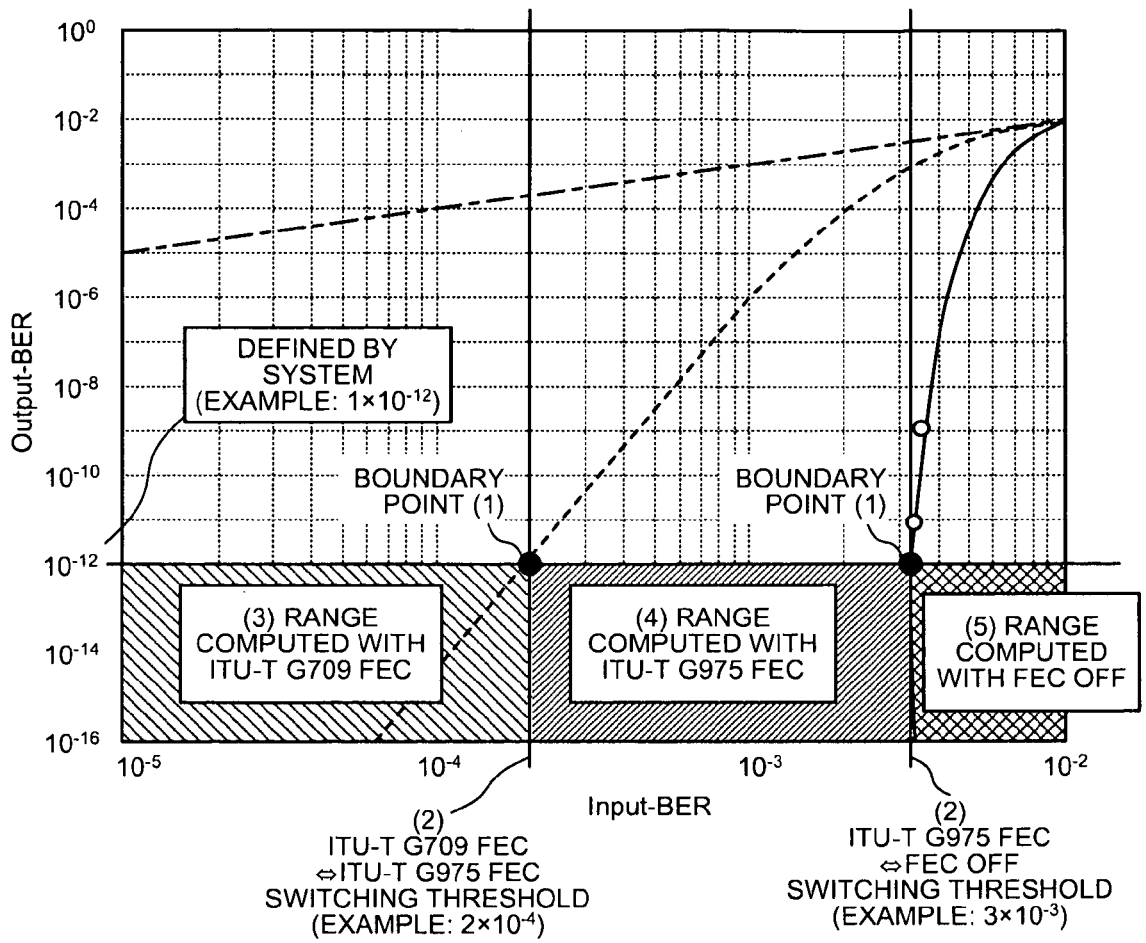
FIG. 11 is a drawing for explaining a reading unit and a setting unit in the second embodiment.

Then, in the second embodiment, the reading unit 503 reads each boundary point, as depicted in FIG. 11. Specifically, as indicated by (1) of FIG. 11, from the correspondence stored in the relation storage unit 501, the reading unit 503 reads a boundary point corresponding to the allowable ratio accepted by the accepting unit 502 for each FEC technique. The boundary point indicates a value of the pre-application ratio corresponding to the allowable ratio. Also, each boundary point is used as a threshold for switching the FEC technique. FIG. 11 is a drawing for explaining the reading unit and the setting unit in the second embodiment.

For example, as a boundary point for the FEC technique "ITU-T G709 FEC", the reading unit 503 reads "$2\times10^{-4}$". Also, as a boundary point for the FEC technique "ITU-T G975 FEC", the reading unit 503 reads "$3\times10^{-3}$"

In the second embodiment, the setting unit 504 calculates each applicable condition. Specifically, as indicated by (2) of FIG. 11, the setting unit 504 calculates each boundary point read by the reading unit 503 as a threshold for use in switching the FEC technique. For example, as indicated by (3) of FIG. 11, the setting unit 504 sets the boundary point "$2\times10^{-4}$", for the FEC technique "ITU-T G709 FEC" as an upper limit of the applicable condition for the FEC technique "ITU-T G709 FEC". Also, as indicated by (4) of FIG. 11, the setting unit 504 sets the boundary point "$3\times10^{-3}$" for the FEC technique "ITU-T G975 FEC" as an upper limit of the applicable condition for the FEC technique "ITU-T G975 FEC". Still further, as indicated by (4) of FIG. 11, the setting unit 504 sets the boundary point "$2\times10^{-4}$", for the FEC technique "ITU-T G709 FEC" as a lower limit of the applicable condition for the FEC technique "ITU-T G975 FEC". Still further, as indicated by (5) of FIG. 11, the setting unit 504 sets the boundary point "$3\times10^{-3}$" for the FEC technique "ITU-T G975 FEC" as a lower limit of the applicable condition for the FEC technique "FEC OFF".

That is, the setting unit 504 uses the boundary point read by the reading unit 503 for each FEC technique as an upper threshold for each applicable condition. Also, as a lower threshold for each applicable condition, the setting unit 504 uses a boundary point read for a highest-performance technique from among those for the FEC techniques with a lower error recovery performance than that of the FEC technique for which the threshold is to be set.

Furthermore, the setting unit 504 inputs each calculated applicable condition to the applicable-condition storage unit 421. For example, as an applicable condition for the FEC technique "ITU-T G975 FEC", "$2\times10^{-4}$ to $3\times10^{-3}$" is input.

Applicable-Condition Calculating Process in the Second Embodiment

Figure 12:
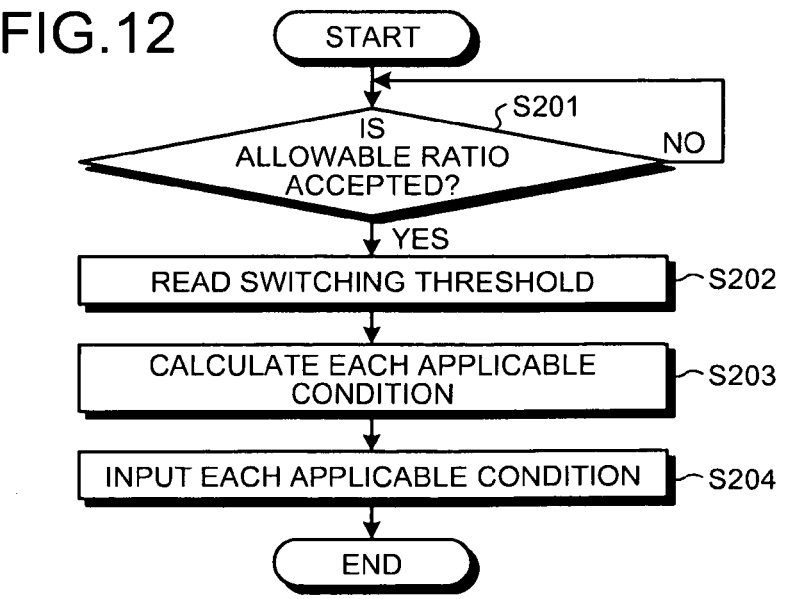
FIG. 12 is a flowchart for explaining an example of flow of an applicable-condition calculating process in the second embodiment.

Next, an example of a flow of an applicable-condition calculating process in the second embodiment is explained by using FIG. 12. FIG. 12 is a flowchart for explaining an example of flow of an applicable-condition calculating process in the second embodiment.

As depicted in FIG. 12, in the second embodiment, when an allowable ratio is accepted by the accepting unit 502 ("Yes" at step S201), the reading unit 503 reads each switching threshold (boundary point) (step S202). The setting unit 504 then calculates each applicable condition (step S203). The setting unit 504 then inputs the calculated applicable condition to the applicable-condition storage unit 421 (step S204).

Effects of the Second Embodiment

According to the second embodiment, each applicable condition can be set from the allowable ratio input by maintenance staff.

[c] Other Embodiments

Meanwhile, while the embodiments of the present invention have been explained, the present invention is not meant to be restricted to these embodiments explained above. Thus, in the following, other embodiments are explained.

[Optical Transmission and Reception System]

For example, although a technique of applying a FEC technique to an optical signal transmitted from the apparatus (reception side) 300 to the apparatus (transmission side) 100 is not explained in the first embodiment, the present invention is not meant to be restricted to this. Specifically, an FEC technique may be applied not only to an optical signal transmitted from the apparatus (transmission side) 100 to the apparatus (reception side) 300 but also to an optical signal transmitted from the apparatus (reception side) 300 to the apparatus (transmission side) 100. At this time, the FEC technique to be applied to the apparatus (reception side) 300 may be changed according to the state of receiving data received by the apparatus (transmission side) 100.

Also, for example, in the first or second embodiment, explanation is made by using an optical transmission and reception system including two apparatuses facing each other as an example. However, the present invention is not meant to be restricted to this, and an optical transmission and reception system having two or more apparatuses can be used. For example, an apparatus (intermediate) may be provided between the apparatus (transmission side) 100 and the apparatus (reception side) 300. That is, a FEC technique to be applied may be changed according to the received data's reception state between the facing apparatuses (between the apparatus (transmission side) 100 and the apparatus (intermediate) or between the apparatus (intermediate) and the apparatus (reception side) 300).

Furthermore, for example, in the first or second embodiment, it is assumed for explanation that the apparatus (transmission side) 100 and the apparatus (reception side) 300 have similar functions. However, the present invention is not meant to be restricted to this. For example, the apparatus (transmission side) 100 may have only a function of transmitting an optical signal and a function of receiving a notification about the FEC technique from the apparatus (reception side) 300.

[Applicable Condition]

Still further, for example, in the first or second embodiment, the applicable-condition storage unit 421 has stored therein a range of errors as an applicable condition. However, the present invention is not meant to be restricted to this. For example, the applicable-condition storage unit 421 may has stored therein only a threshold for each FEC technique.

Regarding Combinations of the Embodiments

For example, in the first embodiment, in addition to the methodology of changing the FEC technique according to the received data's reception state, for example, a methodology (1) of using the FEC technique "FEC OFF" when the ratio of errors included in the data is higher than a predetermined ratio, and a methodology (2) of using the FEC technique "FEC OFF" in the case of an input break are used in combination are explained. Also, in the second embodiment, a methodology (3) of calculating an applicable condition from the allowable ratio input by maintenance staff is explained. However, the present invention is not meant to be restricted to these first and second embodiments. For example, only the methodology of changing the FEC technique according to the received data's reception state may be used. Also, for example, in addition to the methodology of changing the FEC technique according to the received data's reception state, one or more of the methodologies (1) to (3) above may be used singly or in combination.

[System Configuration]

The process procedure, the control procedure, specific names, and information including various data and parameters (for example, FIGS. 1 to 9, FIG. 11, and FIG. 12) explained in the specification and depicted in the drawings can be arbitrarily changed unless otherwise specified.

Also, each component depicted is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use.

For example, the optical multiplexer (transmission side) 114 is explained in FIG. 2 by using an example in which the optical multiplexer (transmission side) 114 is positioned as being separated into two. The present invention is not meant to be restricted to this, however, and the optical multiplexer (transmission side) 114 positioned as being separated into two may be unified into one. Also, with reference to the example depicted in FIG. 4 for explanation, the FEC control unit (reception side) 410 may be separated into a plurality of components that perform the respective FEC techniques.

[Program]

Figure 13:
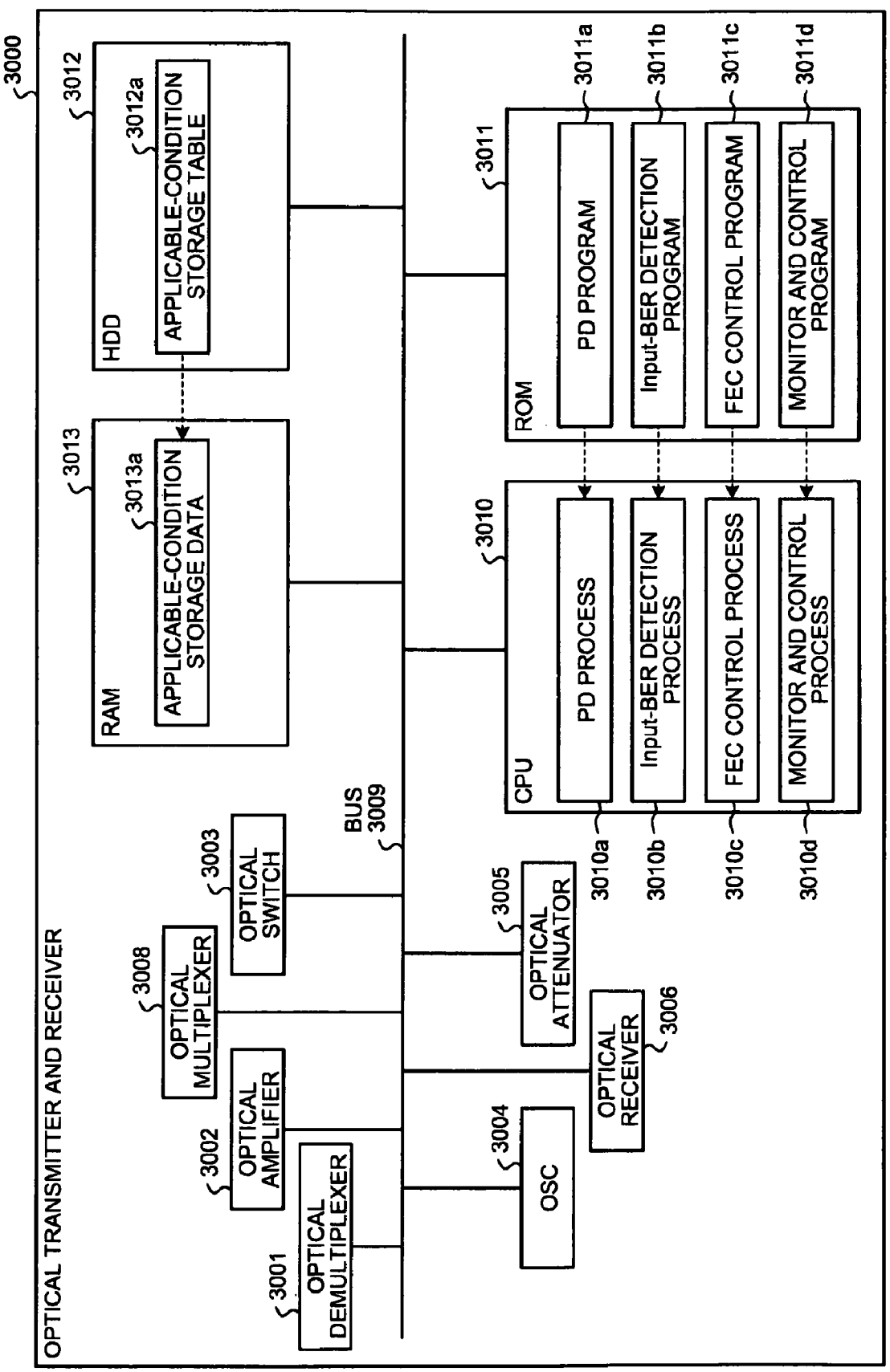
FIG. 13 is a drawing for explaining a program of the optical transmitter and receiver in the first embodiment.

Various processes explained in the embodiments can be achieved by executing a program prepared in advance on a computer, such as a personal computer or work station. In the following, an example of a computer executing a positional-information processing program having similar functions as those in the embodiments above is explained. FIG. 13 is a drawing for explaining a program of the optical transmitter and receiver in the first embodiment.

As depicted in the drawing, an optical transmitter and receiver 3000 in the first embodiment includes an optical demultiplexer 3001, an optical amplifier 3002, an optical switch 3003, an OSC 3004, an optical attenuator 3005, an optical receiver 3006, an optical multiplexer 3008, a Central Processing Unit (CPU) 3010, a Read-Only Memory (ROM) 3011, a hard disk drive (HDD) 3012, and a Random Access Memory 3013, and these components are connected via a bus 3009, for example.

The ROM 3011 has stored therein in advance control programs achieving functions similar to those of the PD unit 401, the Input-BER detecting unit 402, the FEC control unit (reception side) 410, and the monitoring and control unit (reception side) 420 explained in the first embodiment, that is, as depicted in FIG. 13, a PD program 3011a, an Input-BER detection program 3011b, a FEC control program 3011c, and a monitor and control program 3011d. Note that these programs 3011a to 3011d may be unified or separated as appropriate as with the each component of the optical transmitter and receiver depicted in FIG. 13.

With the CPU 3010 reading these programs 3011a to 3011d from the ROM 3011 for execution, as depicted in FIG. 13, each of these programs 3011a to 3011d function as a PD process 3010a, an Input-BER detection process 3010b, a FEC control process 3010c, and a monitor and control process 3010d. Note that these processes 3010a to 3010d correspond to the PD unit 401, the Input-BER detecting unit 402, the FEC control unit (reception side) 410, and the monitoring and control unit (reception side) 420 depicted in FIG. 4.

The HDD 3012 is provided with an applicable-condition storage table 3012a. The applicable-condition storage table 3012a corresponds to the applicable-condition storage unit 421 depicted in FIG. 4.

The CPU 3010 reads the applicable-condition storage table 3012a, stores the read table in the RAM 3013, and uses applicable-condition storage data 3013a stored in the RAM 3013 to execute an optical transmission and reception program.

[Others]

Note that a program executing the optical transmitting and receiving method explained in the embodiments can be distributed via a network, such as the Internet. Also, this program can be recorded on a computer-readable recording medium, such as a hard disk, flexible disk (FD), compact-disk read only memory (CD-ROM), magneto-optical disk (MO), and digital versatile disk (DVD), and can be read by a computer from the recording medium for execution.

According to an embodiment, power consumption can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical transmitter and receiver, comprising:
an applicable-condition storage unit that has stored in advance therein FEC techniques and applicable conditions in association with each other, the FEC techniques being applicable to a counterpart optical transmitter and receiver of the optical transmitter and receiver, and the applicable conditions being indicated by data reception states as applicable conditions for applying the FEC techniques to the counterpart transmitter and receiver;
a measuring unit that measures a data reception state of receiving data transmitted from the counterpart optical transmitter and receiver;
a technique selecting unit that determines an applicable condition satisfying the data reception state measured by the measuring unit from among the applicable conditions stored in the applicable-condition storage unit and selects a technique stored in the applicable-condition storage unit in association with the applicable condition; and
a notifying unit that notifies the counterpart optical transmitter and receiver of the technique selected by the technique selecting unit, wherein
the applicable-condition storage unit has stored therein predetermined ranges limited by a ratio of errors included in the data received by the optical transmitter and receiver as the applicable conditions,
the measuring unit measures the ratio of the errors included in the data received by the optical transmitter and receiver,
the technique selecting unit determines a range including the ratio of the errors measured by the measuring unit from among the ranges stored as the applicable conditions in the applicable-condition storage unit and selects a technique stored in the applicable-condition storage unit in association with the range.

2. The optical transmitter and receiver according to claim 1, wherein
the applicable-condition storage unit has stored therein, for association between the applicable conditions and the techniques, ranges of ratios of errors incapable of error correction to achieve an allowable ratio even by using any of the FEC techniques and techniques of not applying any of the FEC techniques.

3. The optical transmitter and receiver according to claim 1, further comprising:
an input-break measuring unit that measures the receiving data to determine whether the data reception state indicates an input break; and
an input-break notifying unit that notifies the counterpart optical transmitter and receiver of the technique of not using any of the FEC techniques when the input-break measuring unit measures to determine that the data reception state indicates an input break.

4. The optical transmitter and receiver according to claim 1, further comprising:
a relation storage unit that has stored in advance, for each of the techniques, a correspondence between a pre-application ratio indicative of a ratio of errors included in data to which each of the techniques is not applied and a post-application ratio indicative of a ratio of errors included after each of the techniques is applied;
an accepting unit that accepts an allowable ratio;
a reading unit that reads, for each of the techniques, each of the pre-application ratios corresponding to the allowable ratio accepted by the accepting unit from the correspondence stored in the relation storage unit; and
a setting unit that sets, in the application-condition storage unit, each of the pre-application ratios read by the reading unit for each of the techniques as a threshold indicative of an upper limit of each of the ranges associated with the techniques, and
as a threshold indicative of a lower limit of a range associated with a technique having other techniques with a lower error correction performance, sets a pre-application ratio read for a technique with a highest error correction performance from out of the techniques with the lower error correction performance in the application-condition storage unit.

5. The optical transmitter and receiver according to claim 3, further comprising:
a relation storage unit that has stored in advance, for each of the techniques, a correspondence between a pre-application ratio indicative of a ratio of errors included in data to which each of the techniques is not applied and a post-application ratio indicative of a ratio of errors included after each of the techniques is applied;
an accepting unit that accepts an allowable ratio;
a reading unit that reads, for each of the techniques, each of the pre-application ratios corresponding to the allowable ratio accepted by the accepting unit from the correspondence stored in the relation storage unit; and
a setting unit that sets, in the application-condition storage unit, each of the pre-application ratios read by the reading unit for each of the techniques as a threshold indicative of an upper limit of each of the ranges associated with the techniques, and
as a threshold indicative of a lower limit of a range associated with a technique having other techniques with a lower error correction performance, sets a pre-application ratio read for a technique with a highest error correction performance from out of the techniques with the lower error correction performance in the application-condition storage unit.

6. An optical transmission and reception system, comprising:
an optical transmitter and receiver; and
a counterpart optical transmitter and receiver, wherein the optical transmitter and receiver includes
  an applicable-condition storage unit that has stored in advance therein FEC techniques and applicable conditions in association with each other, the FEC techniques being applicable to the counterpart optical transmitter and receiver of the optical transmitter and receiver, and the applicable conditions being indicated by data reception states as applicable conditions for applying the FEC techniques to the counterpart transmitter and receiver;
  a measuring unit that measures a data reception state of receiving data transmitted from the counterpart optical transmitter and receiver;
  a technique selecting unit that determines an applicable condition satisfying the data reception state measured by the measuring unit from among the applicable conditions stored in the applicable-condition storage unit and selects a technique stored in the applicable-condition storage unit in association with the applicable condition; and
  a notifying unit that notifies the counterpart optical transmitter and receiver of the technique selected by the technique selecting unit, and
the counterpart optical transmitter and receiver includes a transmitting unit that transmits, when receives the technique notified by the notifying unit, data to the optical transmitter and receiver by applying the technique, wherein
the applicable-condition storage unit has stored therein predetermined ranges limited by a ratio of errors included in the data received by the optical transmitter and receiver as the applicable conditions,
the measuring unit measures the ratio of the errors included in the data received by the optical transmitter and receiver,
the technique selecting unit determines a range including the ratio of the errors measured by the measuring unit from among the ranges stored as the applicable conditions in the applicable-condition storage unit and selects a technique stored in the applicable-condition storage unit in association with the range.

* * * * *